(12) United States Patent
Yamamoto et al.

(10) Patent No.: US 9,800,337 B2
(45) Date of Patent: Oct. 24, 2017

(54) OPTICAL TRANSMITTER, OPTICAL RECEIVER, OPTICAL CABLE AND LIGHT TRANSMISSION METHOD

(71) Applicant: SONY CORPORATION, Tokyo (JP)

(72) Inventors: Masanari Yamamoto, Kanagawa (JP); Kazuaki Toba, Kanagawa (JP); Kazuyoshi Suzuki, Tokyo (JP); Kazumoto Kondo, Kanagawa (JP); Satoshi Miyazaki, Kanagawa (JP); Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/313,276

(22) PCT Filed: May 13, 2015

(86) PCT No.: PCT/JP2015/002432
§ 371 (c)(1),
(2) Date: Nov. 22, 2016

(87) PCT Pub. No.: WO2015/198517
PCT Pub. Date: Dec. 30, 2015

(65) Prior Publication Data
US 2017/0195051 A1 Jul. 6, 2017

(30) Foreign Application Priority Data

Jun. 24, 2014 (JP) .................................. 2014-129107

(51) Int. Cl.
H04B 10/00 (2013.01)
H04B 10/25 (2013.01)
(Continued)

(52) U.S. Cl.
CPC .......... H04B 10/2503 (2013.01); G02B 6/425 (2013.01); G02B 6/4214 (2013.01); G02B 6/4257 (2013.01); G02B 6/4292 (2013.01)

(58) Field of Classification Search
CPC ...... H04B 10/50; H04B 10/501; H04B 10/60; H04B 10/67
See application file for complete search history.

(56) References Cited

U.S. PATENT DOCUMENTS

| 5,420,954 | A | 5/1995 | Swirhun et al. |
| 5,631,988 | A | 5/1997 | Swirhun et al. |
| 2009/0116793 | A1* | 5/2009 | Nishimura ........... G02B 6/3885 385/78 |

FOREIGN PATENT DOCUMENTS

| JP | 2000-147333 A | 5/2000 |
| JP | 2001-324649 A | 11/2001 |

(Continued)

OTHER PUBLICATIONS

International Search Report dated Aug. 4, 2015, in PCT/JP2015/002432, filed May 13, 2015.

Primary Examiner — Daniel Dobson
(74) Attorney, Agent, or Firm — Oblon, McClelland, Maier & Neustadt, L.L.P.

(57) ABSTRACT

An optical transmitter including an optical connector port, a first light emitter, and a second light emitter. The optical connector port is configured to connect to a connector of an optical cable in a first orientation or a second orientation. The first light emitter is configured to transmit a first optical signal for transmission through the optical cable. The first optical signal transmitted by the first light emitter is reflected by a region of the connector when the connector is attached in the first orientation. The second light emitter is configured to transmit a second optical signal for transmission through the optical cable. The second optical signal transmitted by (Continued)

the second light emitter is reflected by the region when the connector is connected in the second orientation different from the first orientation.

20 Claims, 14 Drawing Sheets

(51) Int. Cl.
*G02B 6/42* (2006.01)
*H04J 14/00* (2006.01)

(56) References Cited

FOREIGN PATENT DOCUMENTS

| JP | 2001324649 A | * | 11/2001 |
| JP | 2007-240866 A | | 9/2007 |
| JP | 2008-292962 A | | 12/2008 |

* cited by examiner

[Fig. 1]
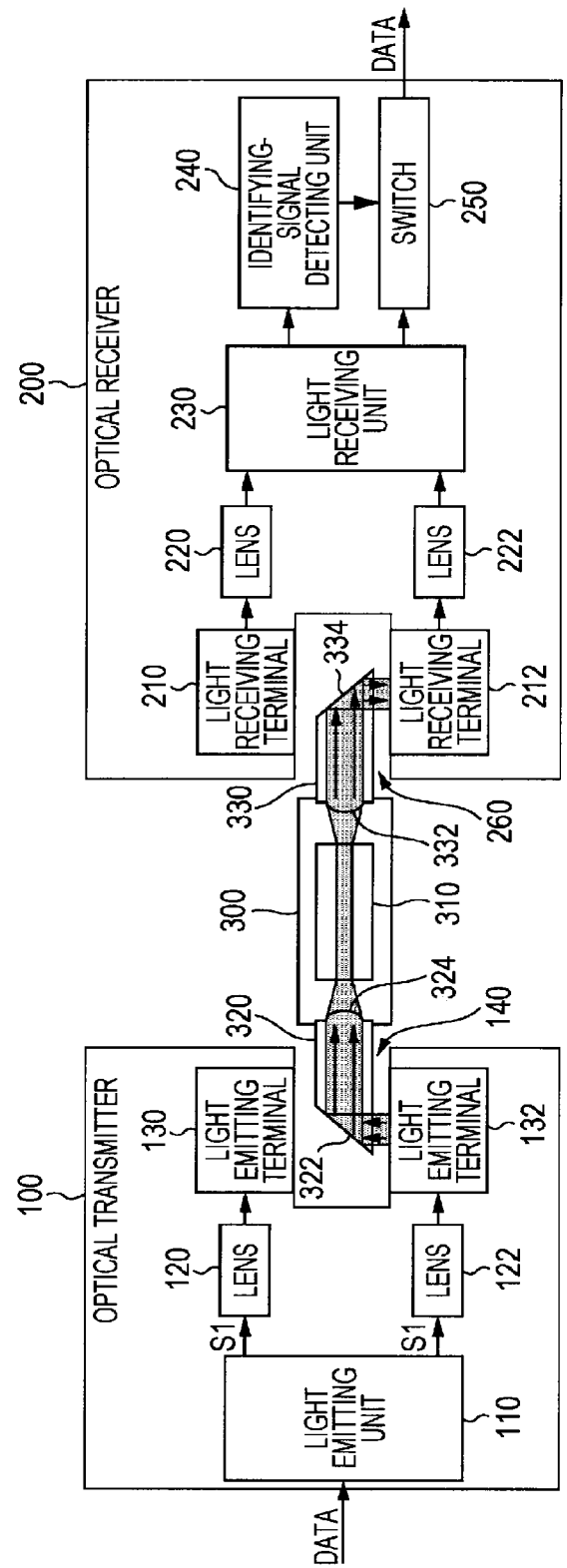

[Fig. 2]
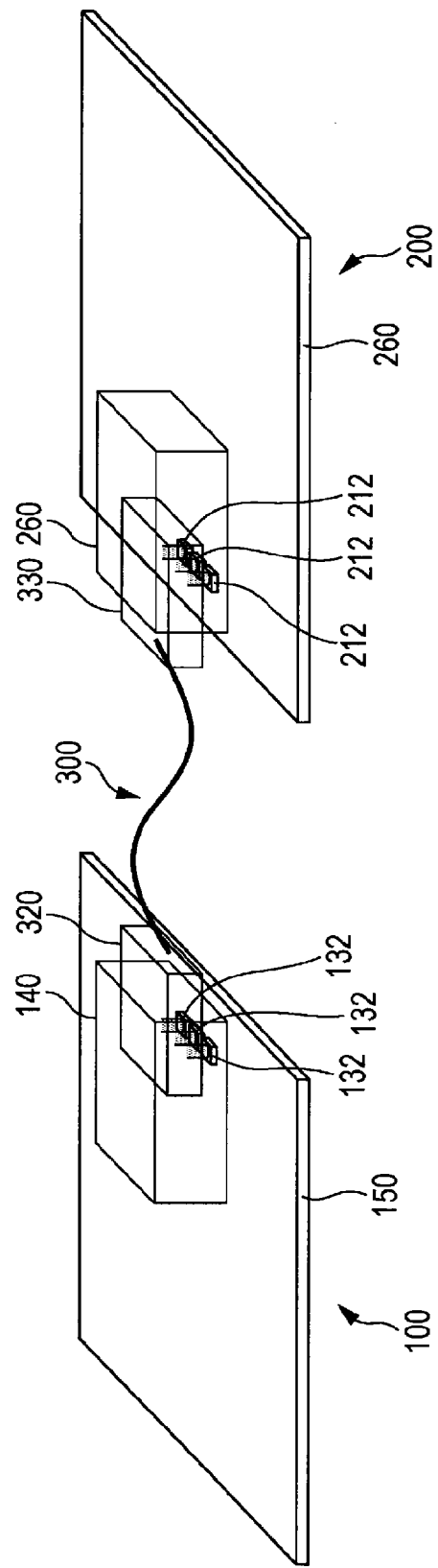

[Fig. 3]
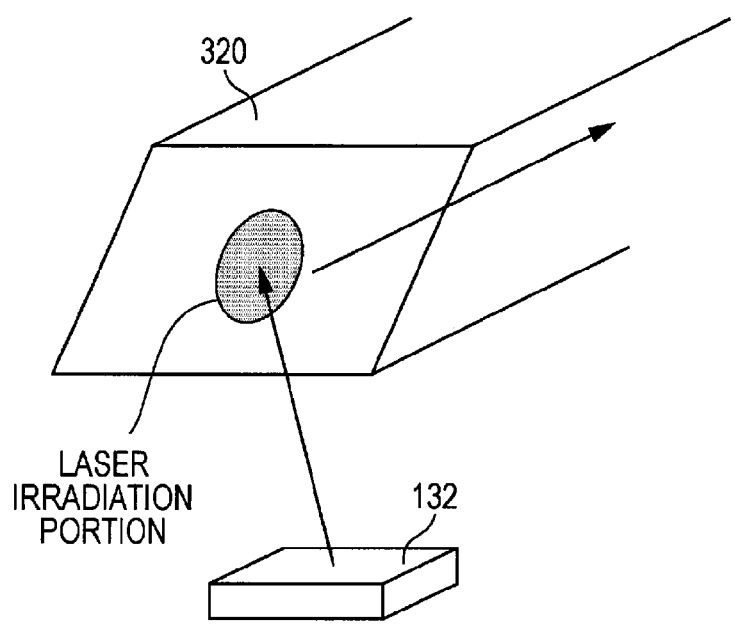
[Fig. 4]
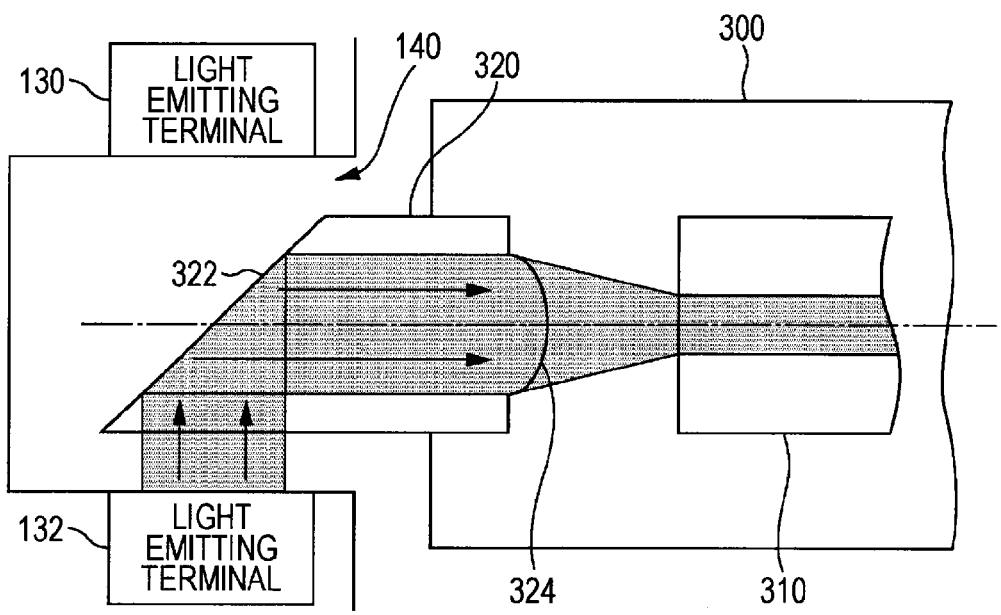

[Fig. 5]
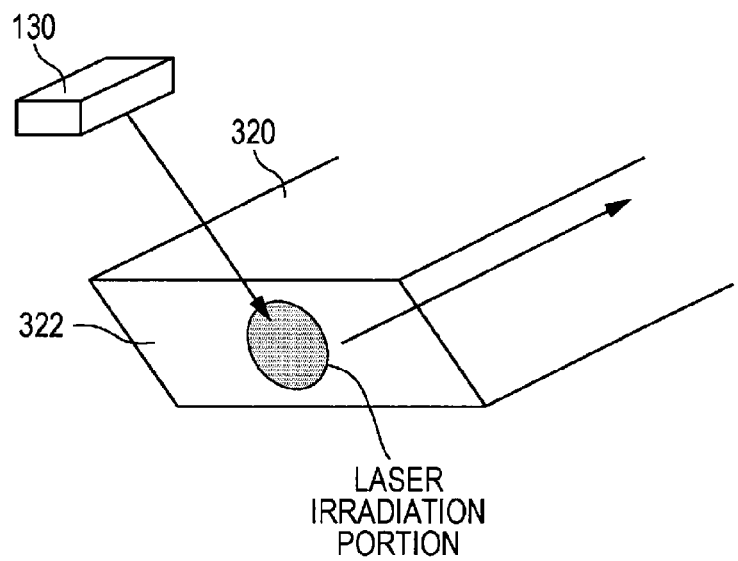
[Fig. 6]
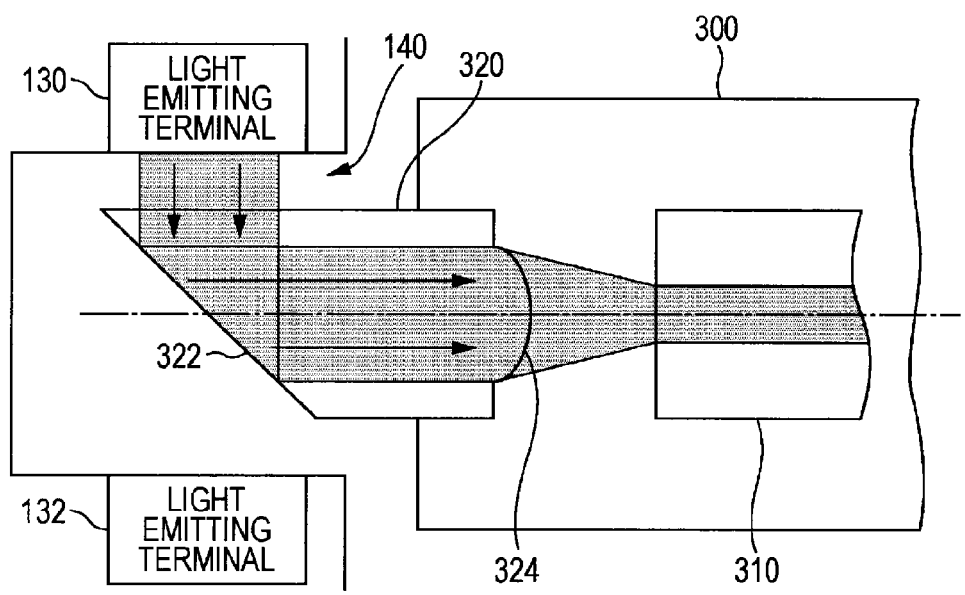

[Fig. 7]
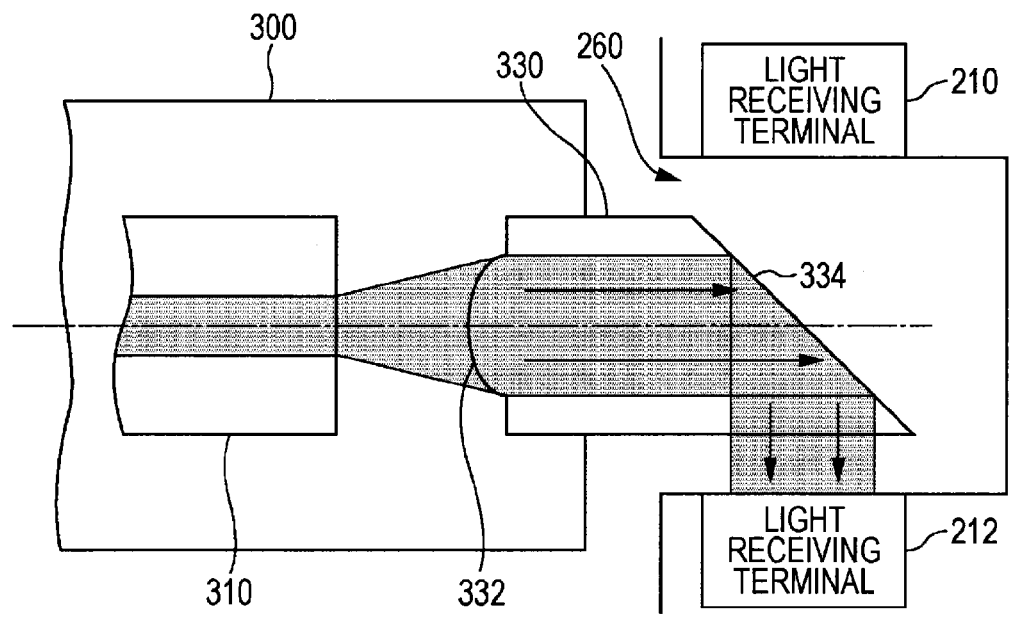
[Fig. 8]
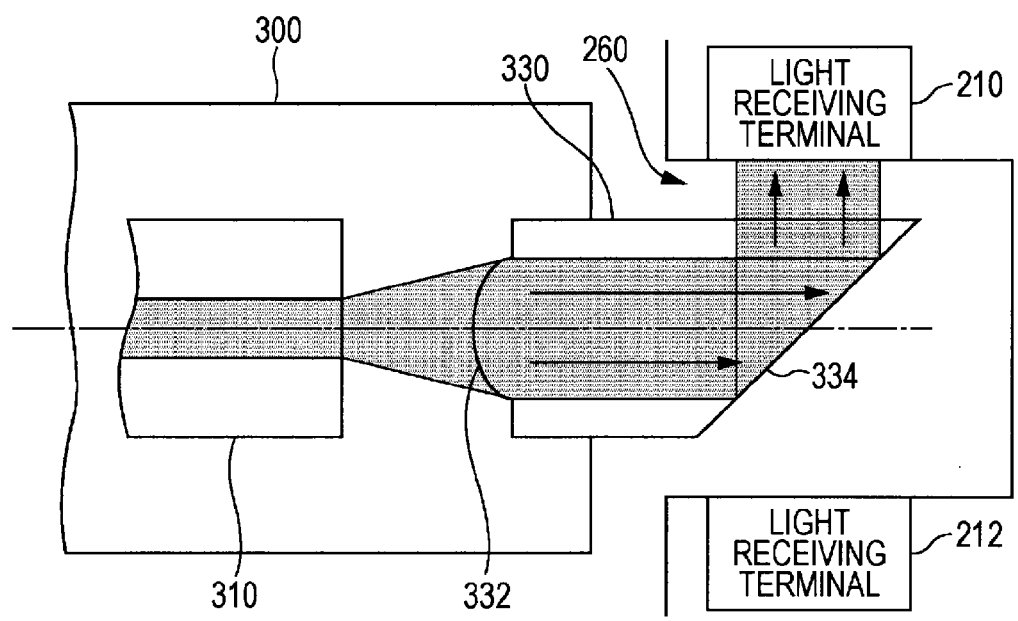

[Fig. 9]
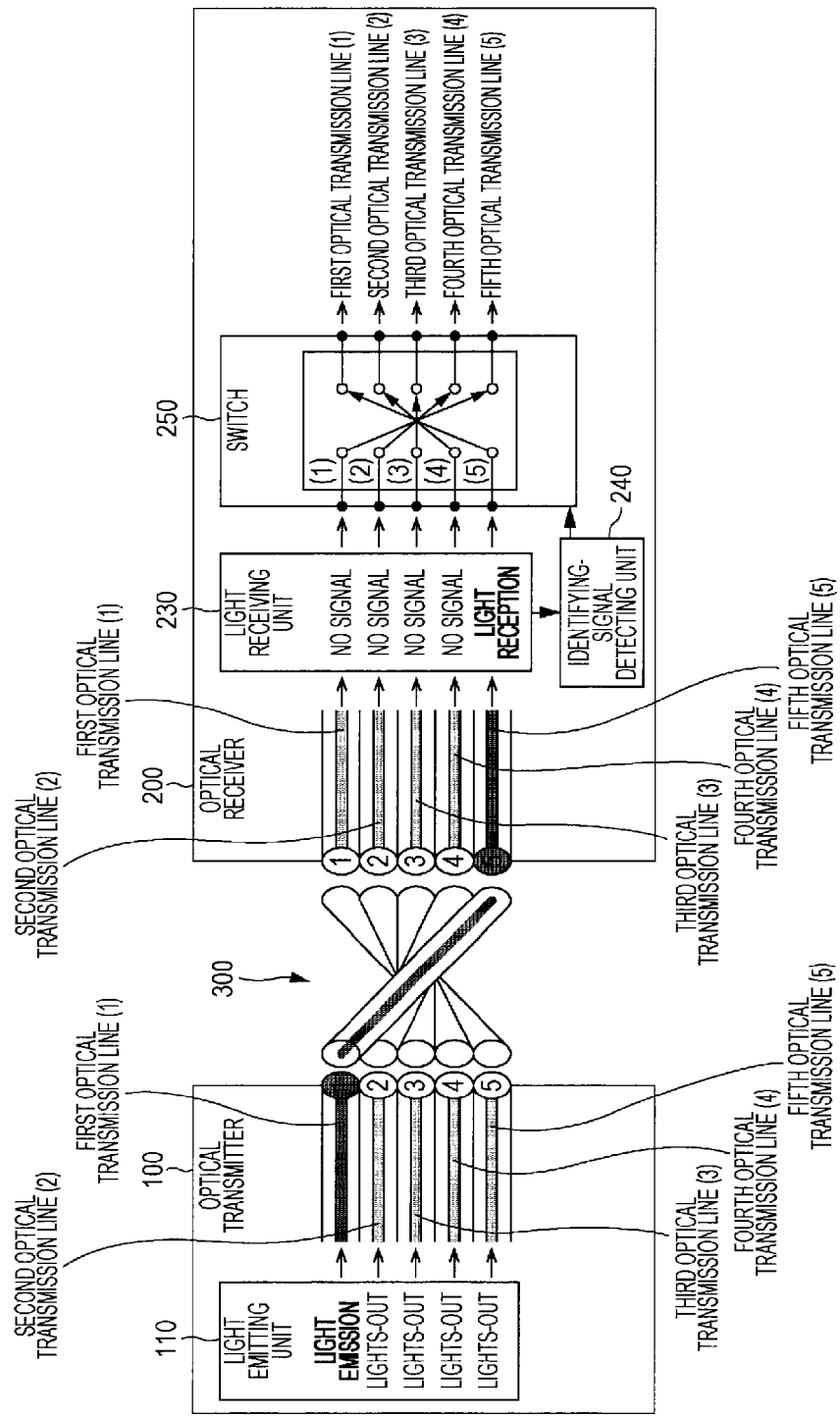

[Fig. 10]
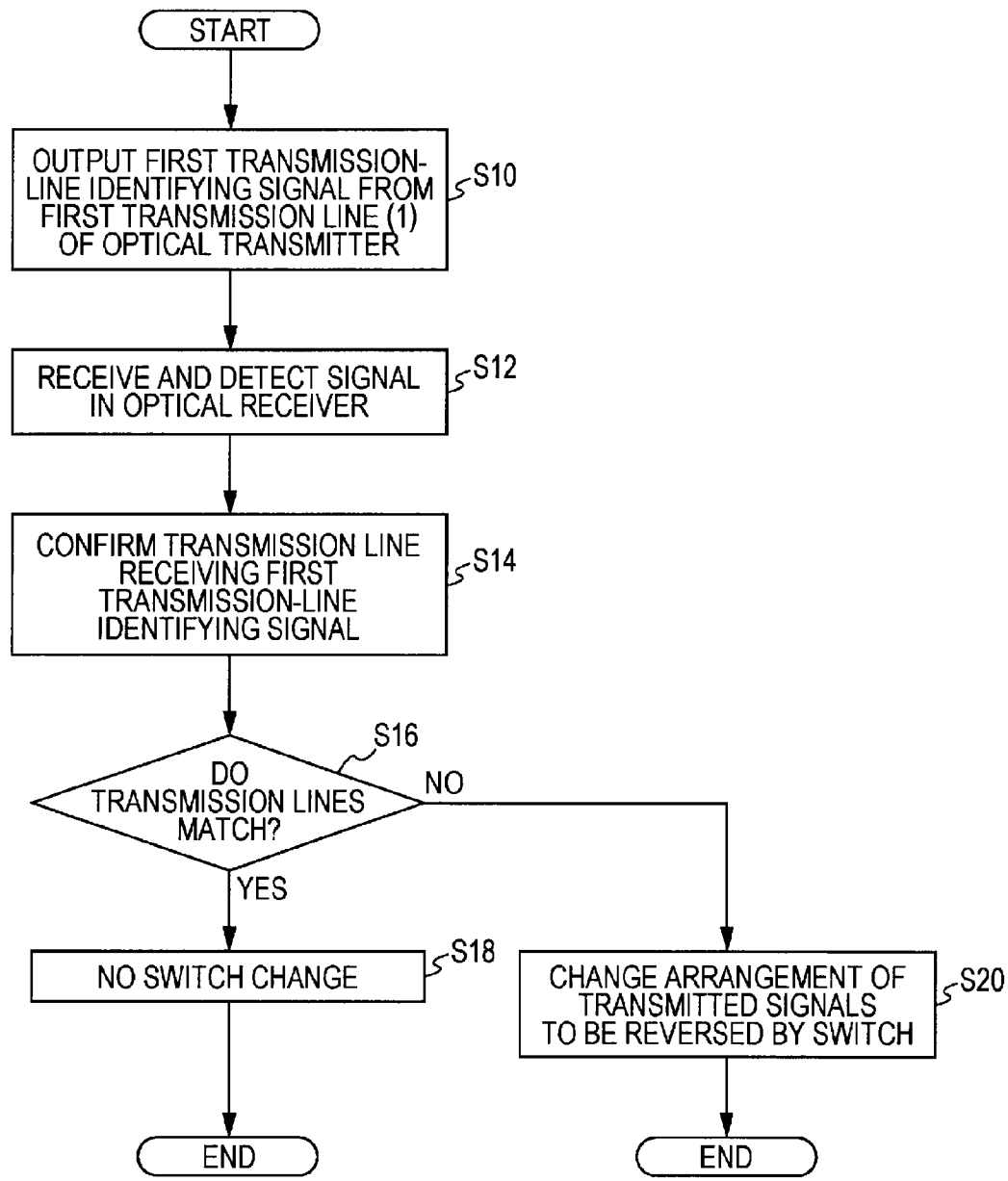

[Fig. 11]
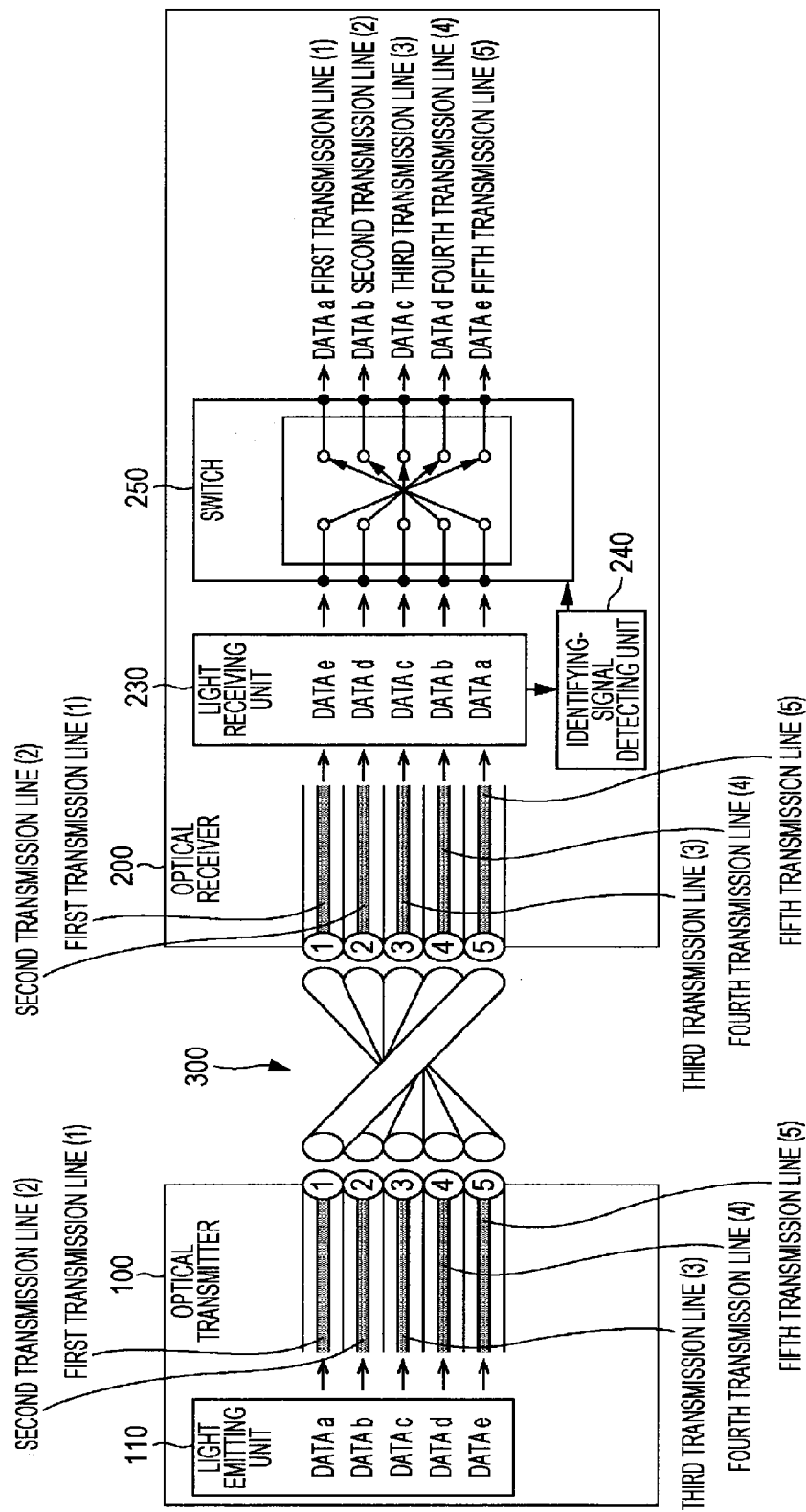

[Fig. 12]
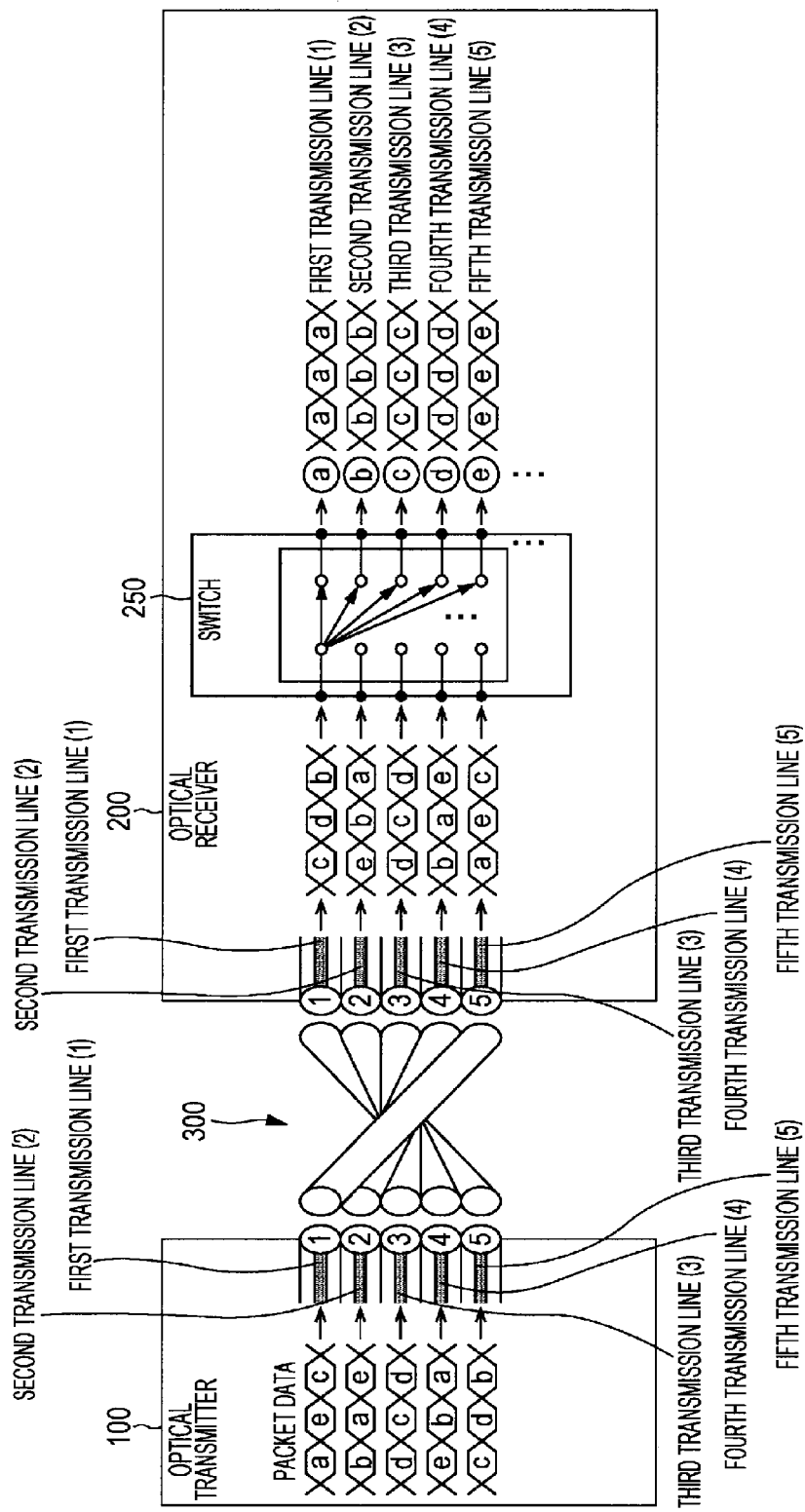

[Fig. 13]
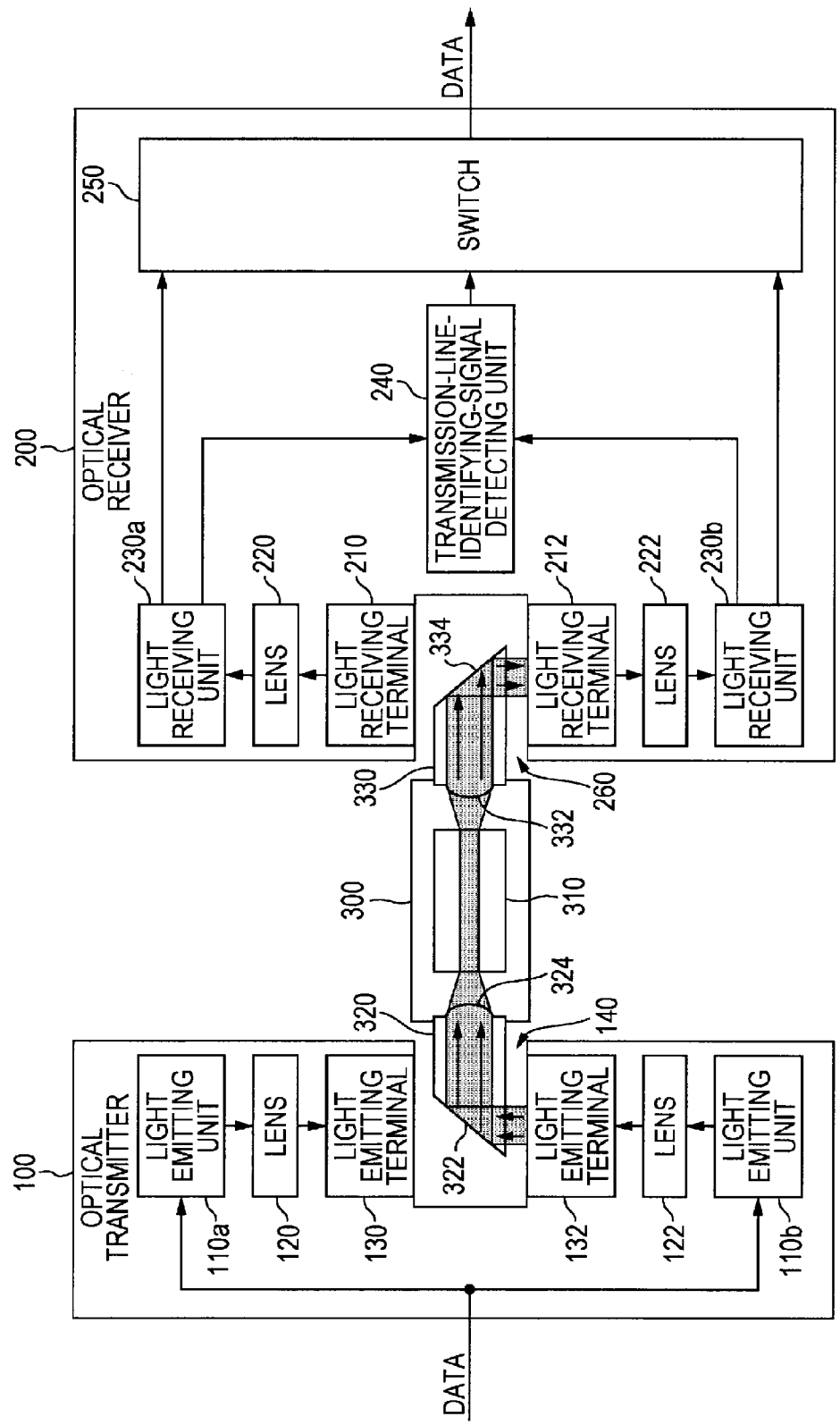

[Fig. 14]
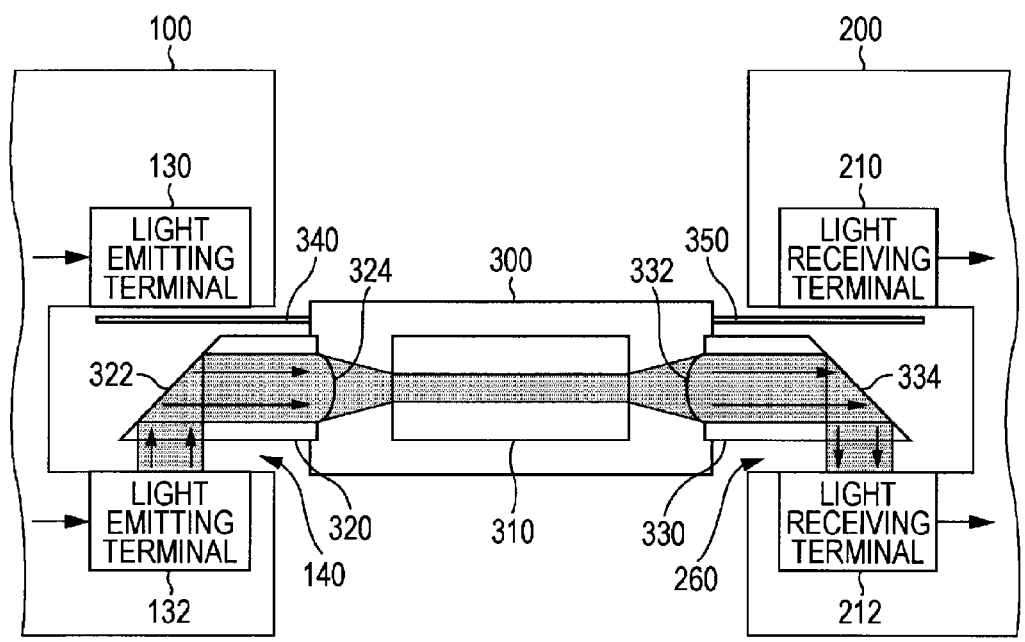

[Fig. 15]
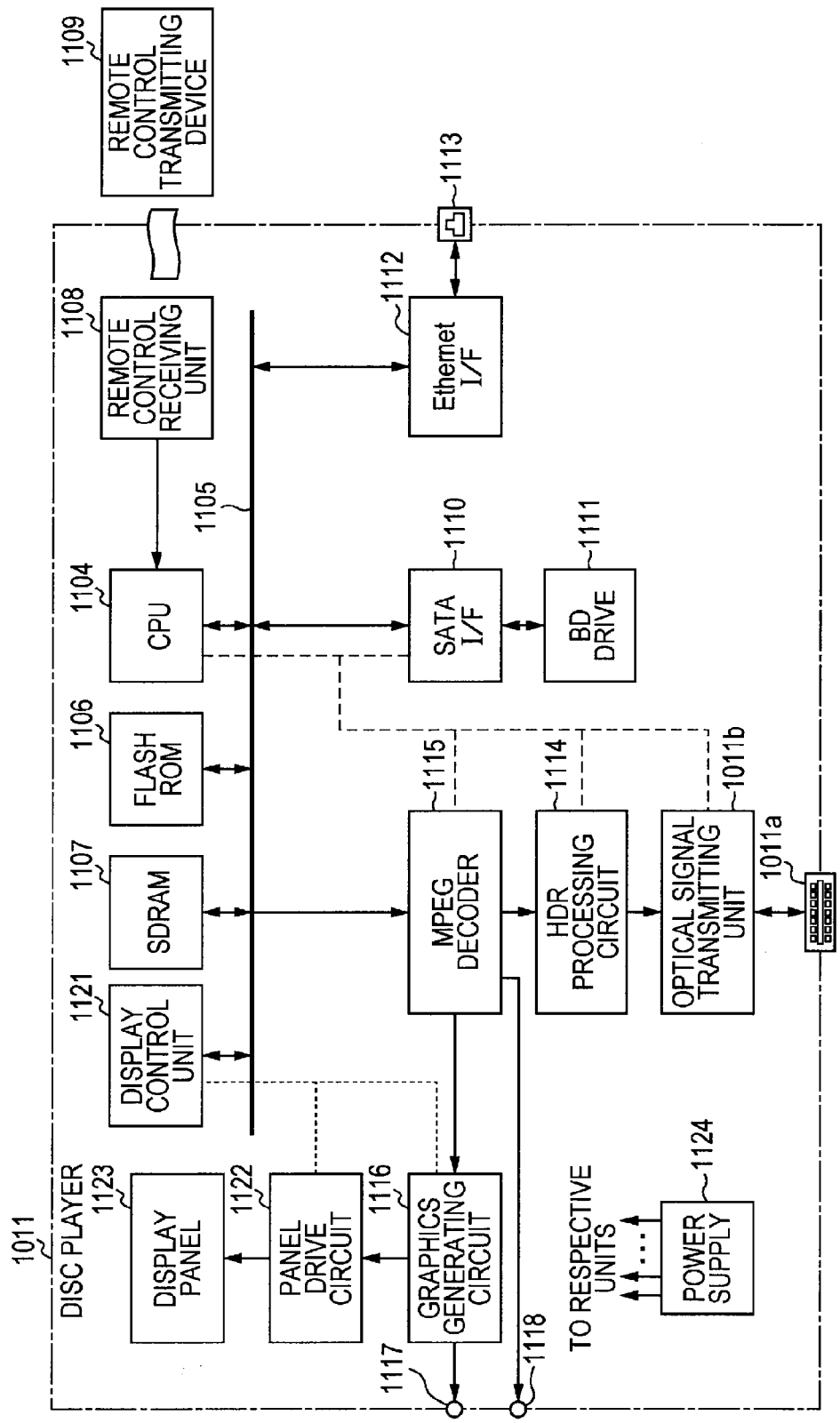

[Fig. 16]
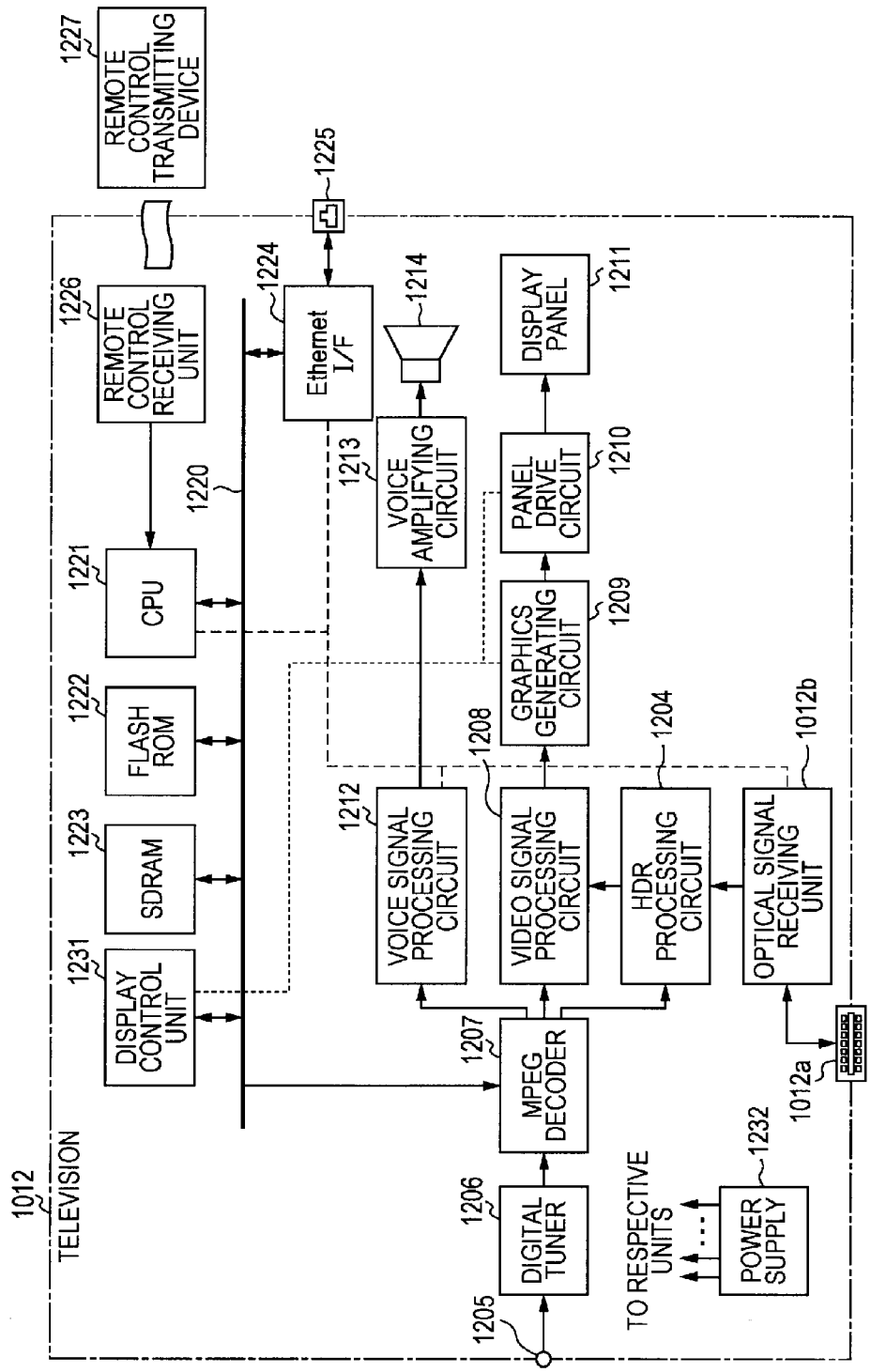

[Fig. 17]
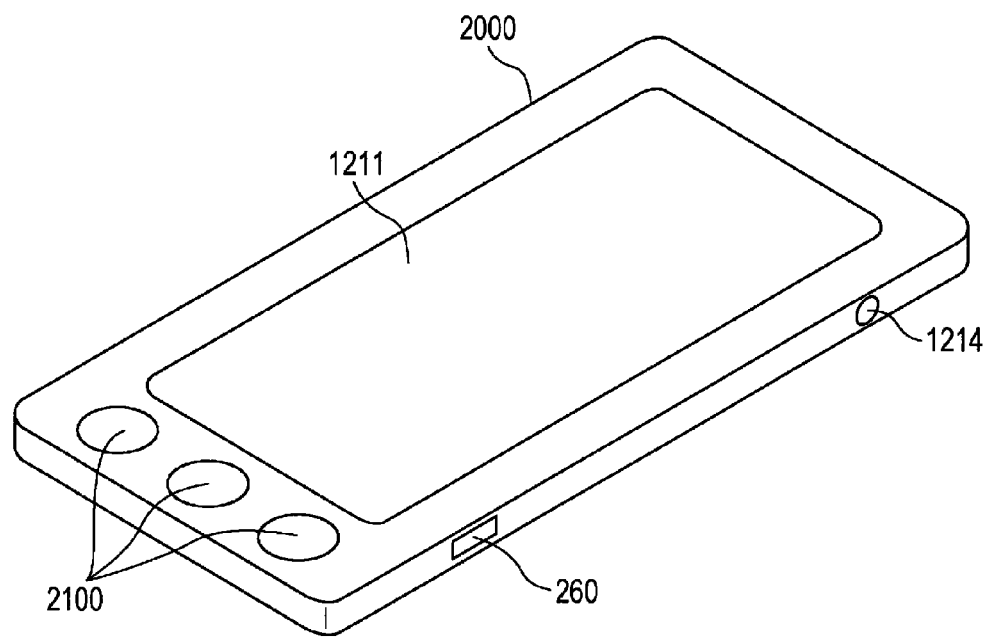

OPTICAL TRANSMITTER, OPTICAL RECEIVER, OPTICAL CABLE AND LIGHT TRANSMISSION METHOD

CROSS REFERENCE TO RELATED APPLICATIONS

This application claims the benefit of Japanese Priority Patent Application JP 2014-129107 filed Jun. 24, 2014, the entire contents of which are incorporated herein by reference.

TECHNICAL FIELD

The present disclosure relates to an optical transmitter, an optical receiver, an optical cable, and a light transmission method.

BACKGROUND ART

In recent years, with a dramatic rise in communication capability, data transmission using light has been used. However, the data transmission using light has been mostly used as data transmission in infrastructure of a basic industry in which the amount of transmitted data is large or data transmission between data servers, and has not been widely used in daily lives of consumers. For this reason, only reliability of the connection between a device and an optical cable is considered as being important, and thus, it is difficult for general users to readily use the data transmission.

Meanwhile, in electrical data transmission that has been widely used for connection between devices for daily lives of consumers, the user can perform the connection between the devices without using a special instrument or skill. In consideration of convenience of the user, there has been introduced a method in which when the cable is attached to the device, the connector can be attached to the device even through the connector is inserted in any direction of the upward or downward directions.

For example, PTL 1 describes a technology related to an optical connector that guides light to an optical transmission line having an optical axis direction different from an optical axis direction of a light output terminal and guides light to a light input terminal having an optical axis direction different from the optical transmission line.

PTL 2 describes the configuration of an optical connector that includes two light contact surfaces, and one light contact surface is connected in a straight line from an optical transmission line of an optical cable and the other light contact surface is perpendicular to the optical transmission line.

PTL 3 describes the configuration in which optical connection with an optical connector is performed on two facing surfaces, but both of an optical transmitter and an optical receiver are arranged in the direction of the optical connector.

CITATION LIST

Patent Literature

PTL 1: Japanese Unexamined Patent Application Publication No. 2008-292962
PTL 2: Japanese Unexamined Patent Application Publication No. 2007-240866
PTL 3: Japanese Unexamined Patent Application Publication No. 2000-147333

SUMMARY

Technical Problem

However, in the technologies described in PTL 1 to PTL 3, any polarities in the upward and downward directions of the connector are unmistakably determined, and thus, it is difficult to connect the cable and the connector in an upside-down state or in another direction. For this reason, the user has to connect the connector and the cable after checking the direction of the connector, and thus, convenience at the time of connecting may become worse.

Accordingly, it is desirable to connect devices that perform light transmission even though the direction of a connector is changed.

Solution to Problem

According to an embodiment of the present disclosure, there is provided an optical transmitter including an optical connector port, a first light emitter, and a second light emitter. The optical connector port is configured to connect to a connector of an optical cable in a first orientation or a second orientation. The first light emitter is configured to transmit a first optical signal for transmission through the optical cable. The first optical signal transmitted by the first light emitter is reflected by a region of the connector when the connector is attached in the first orientation. The second light emitter is configured to transmit a second optical signal for transmission through the optical cable. The second optical signal transmitted by the second light emitter is reflected by the region when the connector is connected in the second orientation different from the first orientation.

According to another embodiment of the present disclosure, there is provided an optical receiver including an optical connector port, a first light receiver, and a second light receiver. The optical connector port is configured to connect to a connector of an optical cable in a first orientation or a second orientation. The first light receiver is configured to receive a first optical signal transmitted through the optical cable. The first optical signal is reflected by a region of the connector when the connector is connected in the first orientation. The second light receiver is configured to receive a second optical signal transmitted through the optical cable. The second optical signal is reflected by the region of the connector when the connector is connected in the second orientation different from the first orientation.

According to still another embodiment of the present disclosure, there is provided an optical cable including an optical transmission line, a connector, and a reflecting surface. The optical transmission line is configured to transmit a first or second optical signal. The first connector is attached to an end of the optical transmission line, and is configured to connect to an optical connector connecting port of a device in a first orientation or a second orientation. The first reflecting surface is formed at the connector, configured to reflect the first optical signal transmitted by a first light emitter into the optical transmission line or toward a first light receiver when the connector is connected to the device in the first orientation and configured to reflect a second optical signal transmitted by a second light emitter into the optical transmission line or toward a second light receiver when the connector is connected to the transmission device in the second orientation.

According to still another embodiment of the present disclosure, there is provided a light transmission method including connecting an optical connector port of a transmission device including first and second light emitters to a first connector of an optical cable connected in a first orientation in which first optical signals are received from the first light emitters or a second orientation in which second optical signals are received from the second light emitters and which is different from the first orientation via a plurality of first optical transmission lines. The method further includes connecting an optical connector port of a reception device including first and second light receivers to a second connector of the optical cable connected in a first orientation in which the first optical signals are received by the first light receiver or a second orientation in which the second optical signals are received by the second light receiver and which is different from the first orientation via a plurality of second optical transmission lines. The reception device is caused to receive identifying information for identifying the plurality of first optical transmission lines of the transmission device. The reception device is caused to respectively match the plurality of first optical transmission lines of the transmission device to the plurality of optical transmission lines of the reception device based on the identifying information. Further, the reception device is caused to switch respective connection states between the plurality of first optical transmission lines of the transmission device and the plurality of second optical transmission lines of the reception device based on the matching result.

Advantageous Effects of Invention

According to the aforementioned embodiments of the present disclosure, it is possible to connect devices that perform light transmission even though the direction of a connector is changed.

The aforementioned effect is not necessarily limited, and the aforementioned effect, any effects described in the present specification instead of the aforementioned effect, or other effects apparent from the present specification may be exhibited.

BRIEF DESCRIPTION OF DRAWINGS

FIG. 1 is a schematic diagram showing the configuration of a system according to an embodiment of the present disclosure.

FIG. 2 is a schematic diagram that specifically shows a connected state of an optical connector connecting unit of an optical transmitter and an optical connector of an optical cable, and a connected state of an optical connector connecting unit of an optical receiver and the optical connector of the optical cable.

FIG. 3 is a schematic diagram showing that light is applied from a light emitting terminal to a reflection surface of the optical connector of the optical cable.

FIG. 4 is a schematic diagram showing that light is applied from the light emitting terminal to the reflection surface of the optical connector of the optical cable.

FIG. 5 is a schematic diagram showing that light is output from the light emitting terminal to the reflection surface of the optical connector of the optical cable.

FIG. 6 is a schematic diagram showing that light is output from the light emitting terminal to the reflection surface of the optical connector of the optical cable.

FIG. 7 is a schematic diagram showing that light reflected by the reflection surface of the optical connector of the optical cable is incident on a light receiving terminal.

FIG. 8 is a schematic diagram showing that light reflected by the reflection surface of the optical connector of the optical cable is incident on the light receiving terminal.

FIG. 9 is a schematic diagram showing an example where signals received by a light receiving unit are rearranged based on order information of the signals received by the light receiving unit.

FIG. 10 is a flowchart showing an example of a process of changing a signal order by a switch.

FIG. 11 is a schematic diagram showing an example where identifying signals are superimposed on data related to all transmission lines.

FIG. 12 is a schematic diagram showing the operation of the switch when transmission data is packet data.

FIG. 13 is a schematic diagram showing an example where two light emitting units are provided in the optical transmitter so as to correspond to two light emitting terminals.

FIG. 14 is a schematic diagram showing an example where a light blocking unit is provided at the optical connector of the optical cable.

FIG. 15 is a schematic diagram showing a configuration example of a disc player as an example of the optical transmitter.

FIG. 16 is a schematic diagram showing a configuration example of a television as an example of the optical receiver.

FIG. 17 is a schematic diagram showing an electronic device (smart phone) as an example of the optical receiver.

DESCRIPTION OF EMBODIMENTS

Hereinafter, preferred embodiments of the present disclosure will be described in detail with reference to the accompanying drawings. In the present specification and the drawings, components that are substantially the same functional configurations will be assigned the same reference numerals, and thus, the redundant description thereof will be omitted.

The description will be given in the following order.
1. Configuration of System according to Embodiment of Present Disclosure
2. Rearrangement of Received Signals
3. Modification Example of Present Embodiment
4. Configuration Example of Disc Player as Example of Optical transmitter
5. Configuration Examples of Television and Electronic Device (Smart Phone) as Examples of Optical Receiver 1. Configuration of System According to Embodiment of Present Disclosure First, the configuration of a system according to an embodiment of the present disclosure will be described with reference to FIG. 1. As shown in FIG. 1, the system according to the present embodiment includes an optical transmitter 100, an optical receiver 200, and an optical cable 300 that connects the optical transmitter 100 and the optical receiver 200.

The optical transmitter 100 includes a light emitting unit 110 of light data, two lenses 120 and 122, two light emitting terminals 130 and 132, and an optical connector connecting unit (e.g., an optical connector port) 140. The optical receiver 200 includes two light receiving terminals 210 and 212, two lenses 220 and 222, a light receiving unit 230, an identifying-signal detecting unit 240, a switch 250, and an optical connector connecting unit 260. The identifying-signal detecting unit 240 detects an arrangement order of optical transmission lines from an identifying signal transmitted from the optical transmitter 100 through the optical cable 300. When the identifying-signal detecting unit 240 detects that the arrangement of optical transmission lines are inverted, the switch 250 switches the arrangement order of the optical transmission lines.

The optical cable 300 includes an optical transmission line 310 for transmitting an optical signal, and optical connectors 320 and 330 that are provided at both ends of the optical transmission line 310. A reflection surface 322 for guiding light from the light emitting terminals 130 and 132 to the optical transmission line 310, and a lens 324 that condenses light from the reflection surface 322 are provided at the optical connector 320. A lens 332 through which the light from the optical transmission line 310 passes, and a reflection surface 334 that guides the light from the lens 332 to the light receiving terminals 210 and 212 of the optical receiver 200 are provided at the optical connector 330.

Image data, voice data and another data transmitted from the optical transmitter 100 to the optical receiver 200 are output as an optical signal S1 from the light emitting unit 110 of the optical transmitter 100. The light emitted as the optical signal from the light emitting unit 110 is incident on the lenses 120 and 122. The incident light is rendered into, for example, parallel light by passing through the lenses 120 and 122, and is output from the light emitting terminals 130 and 132 provided at the optical connector connecting unit 140 to the reflection surface 322 of the optical connector 320. The lens 120 and the light emitting terminal 130 may be implemented as a single member, and the lens 122 and the light emitting terminal 132 may be implemented as a single member.

The optical signals output from the light emitting terminals 130 and 132 are incident on a side surface of the optical connector 320, and are reflected in an optical axis direction of the optical transmission line 310 by the reflection surface 322. In the connected state of the optical cable 300 shown in FIG. 1, the light output from the light emitting terminal 132 is reflected in the optical axis direction of the optical transmission line 310 by the reflection surface 322. The optical signal reflected from reflection surface 322 passes through the lens 324, is condensed on the optical transmission line 310, and is transmitted through the optical transmission line 310. The optical signal output from the optical transmission line 310 is rendered into, for example, parallel light by the lens 332, is reflected by the reflection surface 334, and is output from a side surface of the optical connector 330.

The optical signal output from the side surface of the optical connector 330 is incident on the light receiving terminals 210 and 212 present within the optical connector connecting unit 260 of the optical receiver 200. In the connected state of the optical cable 300 shown in FIG. 1, the light reflected by the reflection surface 334 is incident on the light receiving terminal 212. The light incident on the light receiving terminal 212 passes through the lens 222, is condensed, and is received by the light receiving unit 230.

As shown in FIG. 1, at the optical connector connecting unit 140 of the optical transmitter 100, two light emitting terminals 130 and 132 are formed at portions which vertically face each other in the drawing. Accordingly, even when the optical cable 300 and the optical transmitter 100 are connected while the reflection surface 322 of the optical cable 300 is upside down in the drawing, the light output from the light emitting terminal 130 is reflected by the reflection surface 322, and is guided to the optical transmission line 310. Thus, a user can connect the optical cable 300 to the optical transmitter 100 without considering the direction of the optical cable 300.

Similarly, at the optical connector connecting unit 260 of the optical receiver 200, two light receiving terminals 210 and 212 are formed at portions which vertically face each other in the drawing. Accordingly, even when the optical cable 300 and the optical receiver 200 are connected while the reflection surface 334 of the optical cable 300 is upside down in the drawing, the light refracted by the lens 332 is reflected by the reflection surface 334, and is guided to the light receiving terminal 210. Thus, the user can connect the optical cable 300 to the optical receiver 200 without considering the direction of the optical cable 300.

Since the optical connector 320 and the optical connector 330 have the same configuration, even when the optical connector 320 is connected to the optical connector connecting unit 260 of the optical receiver 200 and the optical connector 330 is connected to the optical connector connecting unit 140 of the optical transmitter 100, it is possible to transmit the optical signal from the optical transmitter 100 to the optical receiver 200.

Although it has been illustrated in FIG. 1 that the optical transmitter 100 includes one light emitting unit 110, a group of light emitting terminals 130 and 132 and a group of lenses 120 and 122 so as to correspond to the optical cable 300 including one optical transmission line 310, when the optical cable 300 includes a plurality of optical transmission lines, the optical transmitter 100 may include a plurality of light emitting units, and a plurality of groups of light emitting terminals and lenses. Similarly, although it has been illustrated in FIG. 1 that the optical receiver 200 includes one light receiving unit 230, a group of light receiving terminals 210 and 212, and a group of lenses 220 and 222 so as to correspond to the optical cable 300 including one optical transmission line, when the optical cable 300 includes a plurality of optical transmission lines, the optical receiver 200 may include a plurality of light receiving units, and a plurality of groups of light receiving terminals and lenses. In FIG. 1, although simplex communication from the optical transmitter 100 to the optical receiver 200 has been described, duplex communication may be performed. The lenses 120 and 122 may be disposed at positions of the light emitting terminals 130 and 132, and the lenses 220 and 222 may be disposed at positions of the light receiving terminals 210 and 212.

FIG. 2 is a schematic diagram that specifically shows a connected state of the optical connector connecting unit 140 of the optical transmitter 100 and the optical connector 320 of the optical cable 300, and a connected state of the optical connector connecting unit 260 of the optical receiver 200 and the optical connector 330 of the optical cable 300. FIG. 2 shows the configuration when transmission data is sent from the optical transmitter 100 to the optical receiver 200 through a plurality of optical transmission lines, and shows that three optical transmission lines are used. In the configuration shown in FIG. 2, the optical cable 300 includes three optical transmission lines 310. As shown in FIG. 2, the optical transmitter 100 includes a substrate 150, and the optical connector connecting unit 140 is provided on the substrate 150. Three light emitting terminals 132 are arranged on the substrate 150 along the surface of the substrate 150. The three light emitting terminals 132 are provided so as to correspond to the three optical transmission lines 310. Although not shown in FIG. 2, similarly to FIG. 1, three light emitting terminals 130 are provided at positions facing the three light emitting terminals 132 with the optical connector 320 interposed therebetween.

The optical receiver 200 includes a substrate 260, and the optical connector connecting unit 260 is provided on the substrate 260. Three light receiving terminals 212 are arranged on the substrate 260 along the surface of the substrate 260. The three light receiving terminals 212 are provided so as to correspond to the three optical transmission lines 310. Although not shown in FIG. 2, similarly to FIG. 1, three light receiving terminals 210 are provided at positions facing the three light receiving terminals 212 with the optical connector connecting unit 260 interposed therebetween.

According to the configuration shown in FIG. 2, the three light emitting terminals 132 and the three light emitting terminals 130 are provided at the optical transmitter 100 so as to correspond to the three optical transmission lines 310. Accordingly, even when the optical connector 320 of the optical cable 300 is connected upside down (is rotated by 180 degrees), it is possible to transmit light output from the three light emitting terminals 130 to the optical receiver 200 through the optical transmission lines 310 of the optical cable 300. The three light receiving terminals 212 and the three light receiving terminals 210 are provided at the optical receiver 200 so as to correspond to the three optical transmission lines 310. Accordingly, even when the optical connector 330 of the optical cable 300 is connected upside down, it is possible to receive light output from the three optical transmission lines 310 of the optical cable 300 by the three light receiving terminals 210.

In the aforementioned configuration, although the three light emitting terminals 130 and the three light emitting terminals 132 are provided at the positions which face each other in a vertical direction of the substrate 150, the light emitting terminals 130 and the light emitting terminals 132 may be provided at portions which face each other in a horizontal direction of the substrate 150. In this case, it is possible to arrange the light emitting terminals 130 and the light emitting terminals 132 at the portions which face each other in the horizontal direction of the substrate 150 by providing two auxiliary substrates extending in, for example, a vertical direction of the substrate 150 and respectively arranging the light emitting terminals 130 and the light emitting terminals 132 along the surfaces of the auxiliary substrates. Similarly, the light receiving terminals 212 and the light receiving terminals 210 may be provided at portions which face each other in the horizontal direction of the substrate 260.

FIGS. 3 and 4 are schematic diagrams showing that light is applied from the light emitting terminal 132 to the reflection surface 322 of the optical connector 320 of the optical cable 300. FIGS. 3 and 4 show a case where the optical cable 300 is connected to the optical transmitter 100 in the state shown in FIG. 1. As shown in FIG. 3, the light applied from the light emitting terminal 132 is reflected in the optical axis direction of the optical transmission line 310 by the reflection surface 322. As shown in FIG. 4, the optical signal reflected from the reflection surface 322 passes through the lens 324, is condensed on the optical transmission line 310, and is transmitted through the optical transmission lines 310.

FIGS. 5 and 6 are schematic diagrams showing that light is output from the light emitting terminal 130 to the reflection surface 322 of the optical connector 320 of the optical cable 300. FIGS. 5 and 6 show a case where the optical cable 300 is connected upside down to the optical transmitter 100 in the drawing with respect to the state shown in FIG. 1. As shown in FIG. 5, the light output from the light emitting terminal 130 is reflected in the optical axis direction of the optical transmission line 310 by the reflection surface 322. As shown in FIG. 6, the optical signal reflected from the reflection surface 322 passes through the lens 324, is condensed on the optical transmission line 310, and is transmitted through the optical transmission line 310.

FIG. 7 is a schematic diagram showing that light reflected by the reflection surface 334 of the optical connector 330 of the optical cable 300 is incident on the light receiving terminal 212. FIG. 7 shows a case where the optical cable 300 is connected to the optical receiver 200 in the state shown in FIG. 1. As shown in FIG. 7, the optical signal output from the optical transmission line 310 is rendered into, for example, parallel light by the lens 332, is reflected by the reflection surface 334, is output from the side surface of the optical connector 330, and is incident on the light receiving terminal 212.

FIG. 8 is a schematic diagram showing that light reflected by the reflection surface 334 of the optical connector 330 of the optical cable 300 is incident on the light receiving terminal 210. FIG. 8 shows a case where the optical cable 300 is connected upside down to the optical receiver 200 in the drawing with respect to the state shown in FIG. 1. As shown in FIG. 8, the optical signal output from the optical transmission line 310 is rendered into, for example, parallel light by the lens 332, is reflected by the reflection surface 334, is output from the side surface of the optical connector 330, and is incident on the light receiving terminal 210.

As shown in FIGS. 3 to 8, even when the optical connectors 320 and 330 are connected upside down to the optical connector connecting unit 140 and the optical connector connecting unit 260, the optical connectors have the structure in which the optical signal is transmitted. Accordingly, according to the present embodiment, since the user can connect the optical connectors 320 and 330 to the optical transmitter 100 and the optical receiver 200 without considering the upward and downward directions of the optical connectors, it is possible to greatly improve convenience of the user.

2. Rearrangement of Received Signals

Meanwhile, if the number of signal lines (the number of optical transmission lines 310) through which signals are transmitted is plural, when the optical connectors 320 and 330 are connected upside down, it is considered that the connection between the signal lines is switched between the optical transmitter 100 and the optical receiver 200. For example, when four signal lines (1) to (4) are provided, signals which are output from the optical transmitter 100 and are arranged in an order (1), (2), (3) and (4) are arranged in an order of (4), (3), (2) and (1) in some cases when received by the optical receiver 200. In such a case, in order to correctly transmit data sent from the optical transmitter 100, in the optical receiver 200, the identifying-signal detecting unit 240 detects an arrangement order of transmitted signals based on the signals received by the light receiving unit 230. The identifying-signal detecting unit 240 outputs a switch switching control signal to the switch 250 based on the detected arrangement order of the transmitted signals. The switch 250 rearranges the signals received by the light receiving unit 230 based on the switch switching control signal. In the aforementioned example, the signals received in the order of (4), (3), (2) and (1) are correctly rearranged in the order of (1), (2), (3) and (4).

FIG. 9 is a schematic diagram showing an example where the signals received by the light receiving unit 230 are rearranged based on order information related to the signals received by the light receiving unit 230. Since it is detected whether or not the signals received by the light receiving unit 230 are arranged in a signal arrangement order (forward direction) defined by the optical transmitter 100 or a reverse direction thereof, a first transmission-line identifying signal is superimposed on a first optical transmission line (1) of the optical transmitter 100, and the superposed signal is transmitted to the optical receiver 200. As shown in FIG. 9, the first transmission-line identifying signal is transmitted by emitting only the first optical transmission line (1), and the signals are not transmitted by turning off second to fifth optical transmission lines. In the optical receiver 200, the light receiving unit 230 receives the signals transmitted from the optical transmitter 100, and the identifying-signal detecting unit 240 detects the first transmission-line identifying signal. When the optical receiver has a function of giving feedback indicating that the identifying-signal detecting unit 240 detects the first transmission-line identifying signal to the optical transmitter 100, after the feedback received from the optical receiver 200 is confirmed by the optical transmitter 100, it is possible to end the transmitting of the signal on which the first transmission-line identifying signal is superposed by the optical transmitter 100. That is, the first transmission-line identifying signal may be necessary only to be transmitted by being superimposed on transmission data at the time of starting communication.

In the example shown in FIG. 9, since the optical connector 330 is upside down with respect to the optical cable 300, the identifying-signal detecting unit 240 detects the first transmission-line identifying signal on a fifth optical transmission line (5) of the optical receiver 200. Thus, the identifying-signal detecting unit 240 transmits the switch switching control signal to the switch 250 such that the connection between a first optical transmission line (1) and a fifth optical transmission line (5) is inverted. The switch 250 switches the transmission lines based on the switch switching control signal. Thus, as shown in FIG. 9, in the switch 250, an input terminal (5) is connected to an input-side first optical transmission line (1), an input terminal (4) is connected to an input-side second optical transmission line (2), an input terminal (3) is connected to an input-side third optical transmission line (3), an input terminal (2) is connected to an input-side fourth optical transmission line (4), and an input terminal (1) is connected to an input-side fifth optical transmission line (5). Thus, it is possible to respectively match the first optical transmission lines (1) to the fifth optical transmission lines (5) each other between the optical transmitter 100 and the optical receiver 200.

As shown in FIG. 9, in the optical transmitter 100, the optical receiver 200 and the optical cable 300, if the first optical transmission lines (1) to the fifth optical transmission lines (5) are sequentially arranged in one direction, when the optical cable 300 is connected to the optical transmitter 100 or the optical receiver 200 in the reverse direction, the first optical transmission lines (1) to the fifth optical transmission lines (5) are connected between the optical transmitter 100 and the optical receiver 200 in the reverse direction. In this case, as mentioned above, the optical receiver 200 can detect whether or not the optical cable 300 is connected in the reverse direction by transmitting the first transmission-line identifying signal to only the first optical transmission line (1). When the order of the transmission lines is recognized, the transmission-line identifying signal may not be necessarily sent from the first transmission line (1). It is possible to detect whether or not the optical cable 300 is connected in the reverse direction by transmitting transmission-line identifying signals to only the second optical transmission line (2) or the fourth optical transmission line (4).

FIG. 10 is a flowchart showing an example of a process of changing a signal order by the switch 250. First, in step S10, the optical transmitter 100 outputs the first transmission-line identifying signal from a first line (first optical transmission line (1)) among a plurality of transmission signal lines. In step S12, the first transmission-line identifying signal output from the first optical transmission line (1) in step S10 is received by the optical receiver 200, and is detected by the identifying-signal detecting unit 240. In step S14, the transmission line that receives the first transmission-line identifying signal is confirmed by comparing the optical transmission line which receives the first transmission-line identifying signal in step S12 with the first optical transmission line (1) previously defined by the optical receiver 200. In step S16, it is determined whether or not the transmission line that receives the first transmission-line identifying signal in step S12 matches the first optical transmission line (1) previously defined by the optical receiver 200. When the transmission lines match each other, this process proceeds to step S18, and when the transmission lines do not match each other, this process proceeds to step S20. In step S18, the optical receiver 200 maintains the previously defined arrangement of the optical transmission lines without switching the transmission lines by the switch 250. Meanwhile, in step S20, as shown in FIG. 9, the switch 250 performs switching such that the arrangement of transmitted signals is inverted. After steps S18 and S20, this process is ended.

In FIG. 1, the switch 250 may be disposed as an optical switch at a previous stage of the light receiving unit 230. An identifier (ID) for defining the content of a signal may be previously assigned to data, and the switch 250 may assign the data by identifying the identifier. FIG. 11 is a schematic diagram showing an example where identifying signals are superimposed on data items of all transmission lines. In the example shown in FIG. 11, in the optical transmitter 100, an identifying signal (Data a) is superimposed on the first optical transmission line (1), an identifying signal (Data b) is superimposed on the second transmission line (2), an identifying signal (Data c) is superimposed on the third optical transmission line (3), an identifying signal (Data d) is superimposed on the fourth optical transmission line (4), and an identifying signal (Data e) is superimposed on the fifth optical transmission line (5). In the optical receiver 200, the light receiving unit 230 receives signals transmitted from the optical transmitter 100, and the identifying-signal detecting unit 240 detects the respective identifying signals (Data a, Data b, Data c, Data d, and Data e). The identifying-signal detecting unit 240 detects the identifying signal (Data e) on the first optical transmission line (1), detects the identifying signal (Data d) on the second transmission line (2), detects the identifying signal (Data c) on the third optical transmission line (3), detects the identifying signal (Data b) on the fourth optical transmission line (4), and detects the identifying signal (Data a) on the fifth optical transmission line (5). For this reason, the identifying-signal detecting unit 240 transmits the switch switching control signal to the switch 250 such that the connection between the first optical transmission line (1) and the fifth optical transmission line (5) is inverted. Thus, as shown in FIG. 11, in the switch 250, an input terminal (5) is connected to an output-side first optical transmission line (1), an input terminal (4) is connected to an output-side second optical transmission line (2), an input terminal (3) is connected to an output-side third optical transmission line (3), an input terminal (2) is connected to an output-side fourth optical transmission line (4), and an input terminal (1) is connected to an output-side fifth optical transmission line (5). Thus, it is possible to respectively match the first transmission lines (1) to the fifth transmission lines (5) each other between the optical transmitter 100 and the optical receiver 200.

FIG. 12 is a schematic diagram showing the operation of the switch 250 when transmission data is packet data. In the example shown in FIG. 12, in the optical transmitter 100, an identifying signal (packet data a, e, and c) is superimposed on the first optical transmission line (1), an identifying signal (packet data b, a, and e) is superimposed on the second transmission line (2), an identifying signal (packet data b, c, and d) is superimposed on the third optical transmission line (3), an identifying signal (packet data e, b, a) is superimposed on the fourth optical transmission line (4), and an identifying signal (packet data c, d, and b) is superimposed on the fifth optical transmission line (5). In the optical receiver 200, the light receiving unit 230 receives the signals transmitted from the optical transmitter 100, and the identifying-signal detecting unit 240 detects the identifying signals (packet data a, b, c, d, and e). The identifying-signal detecting unit 240 transmits the switch switching control signal to the switch 250 such that the pack data a is sent to the first optical transmission line (1), the packet data b is sent to the second transmission line (2), the packet data c is sent to the third optical transmission line (3), the packet data d is sent to the fourth optical transmission line (4) and the packet data e is sent to the fifth optical transmission line (5). Thus, as shown in FIG. 12, the switch is switched for each packet, and the packet data a is transmitted to the first optical transmission line (1), the packet data b is transmitted to the second transmission line (2), the packet data c is transmitted to the third optical transmission line (3), the packet data d is transmitted to the fourth optical transmission line (4), and the packet data e is transmitted to the fifth optical transmission line (5). As stated above, the identifiers (packet data a to e) for defining the content of the signals may be previously assigned to the transmission data, and the switch 250 may assign the data by identifying the identifiers.

3. Modification Example of Present Embodiment

FIG. 13 is a schematic diagram showing an example where two light emitting units 110*a* and 110*b* are provided in the optical transmitter 100 so as to correspond to two light emitting terminals 130 and 132. In the optical receiver 200, two light receiving units 230*a* and 230*b* are provided so as to correspond to the two light emitting terminals 210 and 212. Thus, a plurality of light emitting units 110 and a plurality of light receiving units 230 may be provided for one optical transmission line 310. Any one of the optical transmitter 100 and the optical receiver 200 may have the configuration shown in FIG. 1, and the other of the optical transmitter 100 and the optical receiver 200 may have the configuration shown in FIG. 13.

In the configuration shown in FIG. 13, the direction of the optical connector 320 of the optical cable 300 may be detected, and the emitting of the unused light emitting unit 110*a* may be stopped. Thus, it is possible to prevent unnecessary light reflection within the optical transmitter 100, and it is possible to reduce power consumption. Similarly, in the optical receiver 200, the direction of the optical connector 330 of the optical cable 300 may be detected, and the driving of the unused optical receiving unit 230*a* may be stopped.

FIG. 14 is a schematic diagram showing an example where a light blocking unit 340 is provided at the optical connector 320 of the optical cable 300. The light blocking unit 340 is provided at a side opposite to a region through which light incident on the reflection surface 322 passes to block the light from the light emitting terminal 130. Since the light output from the light emitting terminal 130 is not incident on the optical cable 300, it is possible to prevent unnecessary light reflection within the optical transmitter 100 by blocking the light from the light emitting terminal 130. A light blocking unit 350 is provided in the optical connector 330. The light blocking unit 350 is provided on a side from which the light reflected by the reflection surface 334 is not output. Thus, it is possible to prevent unnecessary light reflection in the optical connector 330.

4. Configuration Example of Disc Player as Example of Optical Transmitter

FIG. 15 shows a configuration example of a disc player 1011 as an example of the optical transmitter 100. The disc player 1011 includes an optical connector connecting unit 1011*a*, and an optical signal transmitting unit 1011*b*. The disc player 1011 includes a central processing unit (CPU) 1104, an internal bus 1105, a flash read only memory (ROM) 1106, a synchronous dynamic random access memory (SDRAM) 1107, a remote control receiving unit 1108, and a remote control transmitting device 1109.

The disc player 1011 includes a serial advanced technology attachment (SATA) interface 1110, a blu-ray disc (BD) drive 1111, an Ethernet interface (I/F) 1112, and a network terminal 1113. The disc player 1011 includes a moving picture expert group (MPEG) decoder 1115, a graphics generating circuit 1116, a video output terminal 1117, a voice output terminal 1118, and an HDR processing circuit 1114.

The disc player 1011 may include a display control unit 1121, a panel drive circuit 1122, a display panel 1123, and a power supply 1124. The "Ethernet" is a registered trademark. The CPU 1104, the flash ROM 1106, the SDRAM 1107, the remote control receiving unit 1108, the SATA interface 1110, the Ethernet interface 1112 and the MPEG decoder 1115 are connected to the internal bus 1105.

The CPU 1104 controls the operations of the respective units of the disc player 1011. The flash ROM 1106 stores control software and keeps data. The SDRAM 1107 constitutes a work area of the CPU 1104. The CPU 1104 controls the respective units of the disc player 1011 by deploying software or data read from the flash ROM 1106 on the SDRAM 1107 and starting the software.

The remote control receiving unit 1108 receives a remote control signal (remote control code) transmitted from the remote control transmitting device 1109, and supplies the received signal to the CPU 1104. The CPU 1104 controls the respective units of the disc player 1011 in response to the remote control code. In this embodiment, although the remote control transmitting device has been described as an user instruction input unit, the user instruction input unit may be implemented by, for example, another configuration such as a switch, a wheel, a touch panel that performs an instruction input through approaching/touching, a mouse, a keyboard, a gesture input unit that detects an instruction input with a camera, or a voice input unit that performs an instruction input by voice.

The BD drive 1111 records content data in a BD disc (not shown) as a disk-shaped recording medium or reproduces the content data from the BD. The BD drive 1111 is connected to the internal bus 1105 through the SATA interface 1110. The MPEG decoder 1115 performs decoding on an MPEG-2 stream reproduced by the BD drive 1111 to obtain image and voice data.

The graphics generating circuit 1116 performs superimposition of graphics data on the image data obtained by the MPEG decoder 1115 when necessary. The video output terminal 1117 outputs the image data output from the graphics generating circuit 1116. The voice output terminal 1118 outputs the voice data obtained by the MPEG decoder 1115.

The panel drive circuit 1122 drives the display panel 1123 based on the video (image) data output from the graphics generating circuit 1116. The display control unit 1121 controls the graphics generating circuit 1116 or the panel drive circuit 1122 to control displaying on the display panel 1123. The display panel 1123 is implemented by, for example, a liquid crystal display (LCD), a plasma display panel (PDP) or an organic electro-luminescence (EL) panel.

In this embodiment, although it has been described that the display control unit 1121 is provided in addition to the CPU 1104, the CPU 1104 may directly control the displaying on the display panel 1123. The CPU 1104 and the display control unit 1121 may be implemented by a single chip, or may be implemented by plural cores. The power supply 1124 supplies power to the respective units of the disc player 1011. The power supply 1124 may be an AC power supply, or may be a battery (storage battery or dry cell).

The optical signal transmitting unit 1011*b* corresponds to the light emitting unit 110 of FIG. 1, and transmits baseband image (video) and voice data from the optical connector connecting unit 1011*a*.

The HDR processing circuit 1114 processes HDR image data among the image data obtained by the MPEG decoder 1115 so as to correspond to a transmission scheme when the HDR image data for displaying an HDR image is transmitted. Here, for example, the HDR image data is formed so as to correspond to a deep-color image format, is formed so as to correspond to a three-dimensional image data format, or is formed so as to correspond to a high-frame-rate image format. The HDR processing circuit 1114 and the optical signal transmitting unit 1011*b* may be implemented by a single chip or may be implemented by plural cores. The type and selection of the transmission scheme of the HDR image data and the packing format of the transmission scheme will be described below in detail.

The operation of the disc player 1011 shown in FIG. 15 will be simply described. At the time of recording, the content data to be recorded is obtained through a non-illustrated digital tuner, or from the network terminal 1113 through the Ethernet interface 1112. The content data is input to the SATA interface 1110, and is recorded in the BD by the BD drive 1111. In some cases, the content data may be recorded in a non-illustrated hard disc drive (HDD) connected to the SATA interface 1110.

At the time of reproducing, the content data (MPEG stream) reproduced from the BD by the BD drive 1111 is supplied to the MPEG decoder 1115 through the SATA interface 1110. In the MPEG decoder 1115, the decoding is performed on the reproduced content data, and the baseband image and voice data are obtained. The image data is output to the video output terminal 1117 via the graphics generating circuit 1116. The voice data is output to the voice output terminal 1118.

At the time of reproducing, the image data obtained by the MPEG decoder 1115 is supplied to the panel drive circuit 1122 via the graphics generating circuit 1116 in response to a user operation, and a reproduction image is displayed on the display panel 1123. The voice data obtained by the MPEG decoder 1115 is supplied to a non-illustrated speaker in response to the user operation, and a voice corresponding to the reproduction image is output.

At the time of reproducing, when the image data and the voice data obtained by the MPEG decoder 1115 are transmitted, the image data and the voice data are supplied to the optical signal transmitting unit 1011*b* and are packed, and are output from the optical signal transmitting unit 1011*b* to the optical connector connecting unit 1011*a*.

When the image data is the HDR image data, the HDR image data is processed so as to correspond to the selected transmission scheme by the HDR processing circuit 1114, and is supplied to the optical signal transmitting unit 1011*b*. At the time of reproducing, when the content data reproduced by the BD drive 1111 is sent to a network, the content data is output to the network terminal 1113 through the Ethernet interface 1112. Here, before the image data is output, the image data is transmitted after being encrypted using a copyright protecting technology such as HDCP, DTCP or DTCP+.

5. Configuration Examples of Television and Electronic Device (Smart Phone) as Examples of Optical Receiver FIG. 16 shows a configuration example of a television 1012 as an example of the optical receiver 200. The television 1012 includes an optical connector connecting unit 1012*a*, an optical signal receiving unit 1012*b*, and an HDR processing circuit 1204. The television 1012 includes an antenna terminal 1205, a digital tuner 1206, an MPEG decoder 1207, a video signal processing circuit 1208, a graphics generating circuit 1209, a panel drive circuit 1210, and a display panel 1211.

The television 1012 includes a voice signal processing circuit 1212, a voice amplifying circuit 1213, a speaker 1214, an internal bus 1220, a CPU 1221, a flash ROM 1222, and a synchronous dynamic random access memory (SDRAM) 1223. The television 1012 includes an Ethernet interface (I/F) 1224, a network terminal 1225, a remote control receiving unit 1226, and a remote control transmitting device 1227. The television 1012 includes a display control unit 1231, and a power supply 1232. The "Ethernet" is a registered trademark.

The antenna terminal 1205 is a terminal for inputting a television broadcast signal received by a reception antenna (not shown). The digital tuner 1206 processes the television broadcast signal input to the antenna terminal 1205, and extracts a partial transport stream (TS) (TS packet of image data and TS packet of voice data) from a predetermined transport stream corresponding to a selected channel by the user.

The digital tuner 1206 extracts program specific information (PSI)/service information (SI) from the obtained transport stream, and outputs the extracted information to the CPU 1221. In the process of extracting a partial TS of an arbitrary channel from a plurality of transport streams obtained by the digital tuner 1206, it possible to obtain information related to a packet ID (PID) of the arbitrary channel from the PSI/SI (PAT/PMT).

The MPEG decoder 1207 obtains image data by performing the decoding on video packetized elementary stream (PES) packets including TS packets of the video data obtained by the digital tuner 1206. The MPEG decoder 1207 obtains voice data by performing the decoding on voice PES packets including TS packets of the voice data obtained by the digital tuner 1206.

The video signal processing circuit 1208 and the graphics generating circuit 1209 perform scaling (resolution conversion) on the image data obtained by the MPEG decoder 1207 or the image data received by the optical signal receiving unit 1012b when necessary, and perform superimposition of graphics data and gamma correction on the HDR image data.

The panel drive circuit 1210 drives the display panel 1211 based on the video (image) data output from the graphics generating circuit 1209. The display control unit 1231 controls the graphics generating circuit 1209 or the panel drive circuit 1210 to control displaying on the display panel 1211. The display panel 1211 is implemented by, for example, a liquid crystal display (LCD), a plasma display panel (PDP), or an organic electro-luminescence (EL) panel.

In this embodiment, although it has been described that the display control unit 1231 is provided in addition to the CPU 1221, the CPU 1221 may directly control displaying on the display panel 1211. The CPU 1221 and the display control unit 1231 may be implemented by a single chip, or may be implemented by plural cores. The power supply 1232 supplies power to the respective units of the television 1012. The power supply 1232 may be an AC power supply, or may be a battery (storage battery or dry cell).

The voice signal processing circuit 1212 performs a necessary process such as D/A conversion on the voice data obtained by the MPEG decoder 1207. The voice amplifying circuit 1213 amplifies a voice signal output from the voice signal processing circuit 1212, and supplies the amplified voice signal to the speaker 1214. The speaker 1214 may be a monaural type or a stereo type. The number of speakers 1214 may be one or two or more. The speaker 1214 may be an earphone or a headphone. The speaker 1214 may be a speaker corresponding to a 2.1 channel or a 5.1 channel. The speaker 1214 may be wirelessly connected to the television 1012. The speaker 1214 may be another device.

The CPU 1221 controls the operations of the respective units of the television 1012. The flash ROM 1222 stores control software and keeps data. The SDRAM 1223 constitutes a work area of the CPU 1221. The CPU 1221 controls the respective units of the television 1012 by deploying the software or data read from the flash ROM 1222 on the SDRAM 1223 and starting the software.

The remote control receiving unit 1226 receives a remote control signal (remote control code) transmitted from the remote control transmitting device 1227, and supplies the received signal to the CPU 1221. The CPU 1221 controls the respective units of the television 1012 based on the remote control code. In this embodiment, although the remote control transmitting device has been described as a user instruction input unit, the user instruction input unit may be implemented by, for example, another configuration such as a touch panel that performs an instruction input through approaching/touching, a mouse, a keyboard, a gesture input unit that detects an instruction input with a camera, or a voice input unit that performs an instruction input by a voice.

The network terminal 1225 is a terminal that is connected to a network, and is connected to the Ethernet interface 1224. The CPU 1221, the flash ROM 1222, the SDRAM 1223, the Ethernet interface 1224, the MPEG decoder 1207 and the display control unit 1231 are connected to the internal bus 1220.

The optical signal receiving unit 1012b receives the baseband image (video) and voice data supplied to the optical connector connecting unit 1012a through the optical cable 300.

When the image data received by the optical signal receiving unit 1012b is the HDR image data, the HDR processing circuit 1204 generates HDR image data by performing a process (decoding) corresponding to a transmission scheme on the HDR image data. That is, the HDR processing circuit 1204 obtains data constituting the HDR image data by performing a reverse process of the HDR processing circuit 1114 of the disc player 1011. The HDR processing circuit 1204 and the optical signal receiving unit 1012b, or the HDR processing circuit 1204 and the video signal processing circuit 1208 may be implemented by a single chip, or may be implemented by plural cores.

The HDR processing circuit 1204 performs an arithmetic operation for generating HDR image data from first data including image data of lower-order 8 bits of the HDR image and second data including image data of higher-order bits of the HDR image, or from first data including image data of higher-order 8 bits of the HDR image and second data including image data of lower-order bits of the HDR image.

For example, when the received content data is sent to a network, the content data is output to the network terminal 1225 through the Ethernet interface 1224. Here, before the image data is output, the image data is transmitted after being encrypted using a copyright protecting technology such as HDCP, DTCP or DTCP+.

The operation of the television 1012 shown in FIG. 16 will be simply described. The television broadcast signal input to the antenna terminal 1205 is supplied to the digital tuner 1206. In the digital tuner 1206, the television broadcast signal is processed, and a predetermined transport stream corresponding to a selected channel by the user is output. A partial TS (TS packet of video data and TS packet of voice data) is extracted from the transport stream, and the partial TS is supplied to the MPEG decoder 1207.

In the MPEG decoder 1207, the video data is obtained by performing decoding on the video PES packets including the TS packets of the video data. The video data is supplied to the panel drive circuit 1210 after performing scaling (resolution conversion) and superimposition of graphics data in the video signal processing circuit 1208 and the graphics generating circuit 1209 when necessary. For this reason, an image corresponding to the selected channel by the user is displayed on the display panel 1211.

In the MPEG decoder 1207, the voice data is obtained by performing decoding on the voice PES packets including the TS packets of the voice data. A necessary process such as D/A conversion is performed on the voice data by the voice signal processing circuit 1212, and the processed voice data is amplified by the voice amplifying circuit 1213 and is supplied to the speaker 1214. Thus, a voice corresponding to the selected channel by the user is output from the speaker 1214.

The content data (image data and voice data) supplied to the Ethernet interface 1224 from the network terminal 1225 is supplied to the MPEG decoder 1207. The subsequent operations are the same as those when the television broadcast signal is received, and thus, the image is displayed on the display panel 1211 and the voice is output from the speaker 1214.

In the optical signal receiving unit 1012b, the image data and the voice data which are transmitted from the disc player 1011 connected to the optical connector connecting unit 1012a through the optical cable 300 are obtained. The image data is supplied to the video signal processing circuit 1208 through the HDR processing circuit 1204. The voice data is directly supplied to the voice signal processing circuit 1212. The subsequent operations are the same as those when the television broadcast signal is received, and thus, the image is displayed on the display panel 1211 and the voice is output from the speaker 1214.

When the image data received by the optical signal receiving unit 1012b is the HDR image data, in the HDR processing circuit 1204, HDR image data is generated by performing a process (decoding) corresponding to the transmission scheme on the HDR image data. The HDR image data is supplied from the HDR processing circuit 1204 to the video signal processing circuit 1208. In the video signal processing circuit 1208, when the HDR image data is supplied, image data for displaying an HDR image is generated based on the HDR image data, and gamma correction is performed on the generated image data based on gamma correction information received by the optical signal receiving unit 1012b. Thus, the HDR image is displayed on the display panel 1211.

The television 1012 shown in FIG. 16 is an example of the optical receiver 200, and the optical receiver 200 may be an electronic device 2000 (smart phone) shown in FIG. 17. The electronic device 2000 includes an optical connector connecting unit 260, a display panel 1211 that displays an image, a speaker 1214 that outputs a voice, and operation buttons 2100. The components related to the display panel 1211 and the speaker 1214 may be the same as those shown in FIG. 16. The substrate 260 shown in FIG. 2 is disposed in parallel with a display surface of the display panel 1211 within the electronic device 2000.

While the preferred embodiments of the present disclosure have been described in detail with reference to the accompanying drawings, the technical scope of the present disclosure is not limited to the embodiments. It should be understood to those skilled in the art of the present disclosure that various changed examples or modified examples can be conceived without departing the technical spirit described in the claims and such changed examples or modified examples can be included in the technical scope of the present disclosure.

The effects described in the present specification are merely descriptive or illustrative, and are not limited. That is, it is apparent to those skilled in the art that the technology described in the present specification can exhibit the above-described effects and other effects from the description of the present specification instead of the above-described effects.

The following configurations are included in the technical scope of the present disclosure.

(1) There is provided an optical transmitter including: an optical connector port configured to connect to a connector of an optical cable in a first orientation or a second orientation; a first light emitter configured to transmit a first optical signal for transmission through the optical cable, the first optical signal transmitted by the first light emitter being reflected by a region of the connector when the connector is attached in the first orientation; and a second light emitter configured to transmit a second optical signal for transmission through the optical cable, the second optical signal transmitted by the second light emitter being reflected by the region when the connector is connected in the second orientation different from the first orientation.

(2) In the optical transmitter described in (1), the optical connector port is disposed between the first and second light emitters.

(3) In the optical transmitter described in (1) or (2), the optical cable includes a plurality of optical transmission lines for transmitting optical signals, and the optical transmitter includes a different pair of the first and second light emitters for each of the plurality of optical transmission lines.

(4) In the optical transmitter described in (3), the optical connector is disposed between the plurality of first light emitters and the plurality of second light emitters.

(5) In the optical transmitter described in any one of (1) to (3), the second orientation is an orientation in which the connector is rotated by 180 degrees with respect to the first orientation when the connection direction of the connector is used as a rotation axis.

(6) The optical transmitter described in (3) may further include a substrate on which an electronic component is mounted, and in which the plurality of first light emitters or the plurality of second light emitters are arranged along the surface of the substrate.

(7) In the optical transmitter described in any one of (1) to (6), the first light emitter is configured to transmit the first optical signal, and the second light emitter is configured to transmit the second optical signal, to the region in directions perpendicular to the connection direction of the connector.

(8) In the optical transmitter described in any one of (1) to (7), the region is a reflecting surface that is configured to reflect the first optical signal transmitted by the first light emitter, and the second optical signal transmitted by the second light emitter, into the optical transmission line of the optical cable.

(9) In the optical transmitter described in (3), one of the plurality of first light emitters or one of the plurality of second light emitters is configured to transmit an identifying signal for identifying one of the plurality of optical transmission lines.

(10) There is provided an optical receiver including: an optical connector port configured to connect to a connector of an optical cable in a first orientation or a second orientation; a first light receiver configured to receive a first optical signal transmitted through the optical cable, the first optical signal being reflected by a region of the connector when the connector is connected in the first orientation; and a second light receiver configured to receive a second optical signal transmitted through the optical cable, the second optical signal being reflected by the region of the connector when the connector is connected in the second orientation different from the first orientation.

(11) In the optical receiver described in (10), the optical connector port is disposed between the first and second light receivers.

(12) In the optical receiver described in (10) or (11), the optical cable includes a plurality of optical transmission lines for transmitting optical signals, and the optical receiver includes a different pair of the first and second light receivers for each of the plurality of optical transmission lines.

(13) In the optical receiver described in any one of (10) to (12), the optical connector connecting port is disposed between the plurality of first light receivers and the plurality of second light receivers, and the second orientation is an orientation in which the connector is rotated by 180 degrees with respect to the first orientation with the connection direction of the connector as a rotation axis.

(14) The optical receiver described in (12) may further includes a substrate on which an electronic component is mounted, wherein the plurality of first light receivers and the plurality of second light receivers are arranged along the surface of the substrate.

(15) In the optical receiver described in any one of (10) to (14), the first light receiver and the second light receiver are configured to receive light in directions perpendicular to the connection direction of the connector.

(16) In the optical receiver described in any one of (10) to (15), the region is a reflecting surface that is configured to reflect the first optical signal transmitted from the optical transmission line of the optical cable toward the first light receiver, and the second optical signal transmitted from the optical transmission line of the optical cable toward the second light receiver.

(17) The optical receiver described in any one of (10) to (16) may further include a display configured to display an image based on the received first or second optical signal or a speaker configured to output a voice based on the received first or second optical signal.

(18) In the optical receiver described in (12), one of the plurality of first light receivers or one of the plurality of second light receivers is configured to receive an identifying signal for identifying one of a plurality of optical transmission lines of a transmission device, and
the optical receiver further includes circuitry configured to detect the identifying signal to respectively match the plurality of optical transmission lines of the transmission device to a plurality of optical transmission lines of the optical receiver, and a switch configured to switch respective connection states between the plurality of optical transmission lines of the transmission device and the plurality of optical transmission lines of the optical receiver based on the matching result.

(19) There is provided an optical cable including: an optical transmission line configured to transmit a first or second optical signal; a connector that is attached to an end of the optical transmission line, and is configured to connect to an optical connector port of a device in a first orientation or a second orientation; a reflecting surface that is formed at the connector, configured to reflect the first optical signal transmitted by a first light emitter into the optical transmission line or toward a first light receiver when the connector is connected to the device in the first orientation and configured to reflect a second optical signal transmitted by a second light emitter into the optical transmission line or toward a second light receiver when the connector is connected to the transmission device in the second orientation

(20) There is provided an optical cable including: an optical transmission line configured to transmit an optical signal; a first connector that is attached to an end of the optical transmission line, and is configured to connect to an optical connector port of a transmission device; a second connector that is attached to an end of the optical transmission line, and is configured to connect to an optical connector port of a reception device; a first reflecting surface that is formed at the first connector, configured to reflect a first optical signal transmitted by a first light emitter of the transmission device into the optical transmission line when the first connector is connected to the transmission device in a first orientation and configured to reflect a second optical signal transmitted by a second light emitter of the transmission device into the optical transmission line when the first connector is connected to the transmission device in a second orientation; and a second reflecting surface that is formed at the second connector, configured to reflect the first optical signal transmitted through the optical transmission line toward a first light receiver of the reception device when the second connector is connected to the reception device in a first orientation and reflect the second optical signal transmitted through the optical transmission line toward a second light receiver of the reception device when the second connector is connected to the reception device in a second orientation.

(20) There is provided a light transmission method including: connecting an optical connector port of a transmission device including first and second light emitters to a first connector of an optical cable connected in a first orientation in which first optical signals are received from the first light emitters or a second orientation in which second optical signals are received from the second light emitters and which is different from the first orientation via a plurality of first optical transmission lines; connecting an optical connector port of a reception device including first and second light receivers to a second connector of the optical cable connected in a first orientation in which the first optical signals are received by the first light receiver or a second orientation in which the second optical signals are received by the second light receiver and which is different from the first orientation via a plurality of second optical transmission lines; causing the reception device to receive identifying information for identifying the plurality of first optical transmission lines of the transmission device; causing the reception device to respectively match the plurality of first optical transmission lines of the transmission device to the plurality of optical transmission lines of the reception device based on the identifying information; and causing the reception device to switch respective connection states between the plurality of first optical transmission lines of the transmission device and the plurality of second optical transmission lines of the reception device based on the matching result.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Optical transmitter
130, 132 Light emitting terminal
140 Optical connector connecting unit
200 Optical receiver
210, 212 Light receiving terminal
240 Identifying-signal detecting unit
250 Switch
260 Optical connector connecting unit
300 Optical cable
310 Optical transmission line
320, 330 Optical connector
322, 334 Reflection surface
1211 Display panel
1214 Speaker
2000 Electronic device

The invention claimed is:
1. An optical transmitter comprising:
an optical connector port configured to connect to a connector of an optical cable in a first orientation or a second orientation;
a first light emitter configured to transmit a first optical signal for transmission through the optical cable, the first optical signal transmitted by the first light emitter being reflected by a region of the connector when the connector is attached in the first orientation; and a second light emitter configured to transmit a second optical signal for transmission through the optical cable, the second optical signal transmitted by the second light emitter being reflected by the region when the connector is connected in the second orientation different from the first orientation.

2. The optical transmitter according to claim 1, wherein the optical connector port is disposed between the first and second light emitters.

3. The optical transmitter according to claim 1,
wherein the optical cable includes a plurality of optical transmission lines for transmitting optical signals, and
the optical transmitter includes a different pair of the first and second light emitters for each of the plurality of optical transmission lines.

4. The optical transmitter according to claim 3, wherein the optical connector is disposed between the plurality of first light emitters and the plurality of second light emitters.

5. The optical transmitter according to claim 1, wherein the second orientation is an orientation in which the connector is rotated by 180 degrees with respect to the first orientation when the connection direction of the connector is used as a rotation axis.

6. The optical transmitter according to claim 3, further comprising:
a substrate on which an electronic component is mounted, wherein the plurality of first light emitters or the plurality of second light emitters are arranged along the surface of the substrate.

7. The optical transmitter according to claim 1, wherein the first light emitter is configured to transmit the first optical signal, and the second light emitter is configured to transmit the second optical signal, to the region in directions perpendicular to the connection direction of the connector.

8. The optical transmitter according to claim 1, wherein the region is a reflecting surface that is configured to reflect the first optical signal transmitted by the first light emitter, and the second optical signal transmitted by the second light emitter, into the optical transmission line of the optical cable.

9. The optical transmitter according to claim 3, wherein one of the plurality of first light emitters or one of the plurality of second light emitters is configured to transmit an identifying signal for identifying one of the plurality of optical transmission lines.

10. An optical receiver comprising:
an optical connector port configured to connect to a connector of an optical cable in a first orientation or a second orientation;
a first light receiver configured to receive a first optical signal transmitted through the optical cable, the first optical signal being reflected by a region of the connector when the connector is connected in the first orientation; and
a second light receiver configured to receive a second optical signal transmitted through the optical cable, the second optical signal being reflected by the region of the connector when the connector is connected in the second orientation different from the first orientation.

11. The optical receiver according to claim 10, wherein the optical connector port is disposed between the first and second light receivers.

12. The optical receiver according to claim 10, wherein the optical cable includes a plurality of optical transmission lines for transmitting optical signals, and the optical receiver includes a different pair of the first and second light receivers for each of the plurality of optical transmission lines.

13. The optical receiver according to claim 10,
wherein the optical connector connecting port is disposed between the plurality of first light receivers and the plurality of second light receivers, and
the second orientation is an orientation in which the connector is rotated by 180 degrees with respect to the first orientation with the connection direction of the connector as a rotation axis.

14. The optical receiver according to claim 12, further comprising:
a substrate on which an electronic component is mounted, wherein the plurality of first light receivers and the plurality of second light receivers are arranged along the surface of the substrate.

15. The optical receiver according to claim 10, wherein the first light receiver and the second light receiver are configured to receive light in directions perpendicular to the connection direction of the connector.

16. The optical receiver according to claim 10, wherein the region is a reflecting surface that is configured to reflect the first optical signal transmitted from the optical transmission line of the optical cable toward the first light receiver, and the second optical signal transmitted from the optical transmission line of the optical cable toward the second light receiver.

17. The optical receiver according to claim 10, further comprising:
a display configured to display an image based on the received first or second optical signal or a speaker configured to output a voice based on the received first or second optical signal.

18. The optical receiver according to claim 12,
wherein one of the plurality of first light receivers or one of the plurality of second light receivers is configured to receive an identifying signal for identifying one of a plurality of optical transmission lines of a transmission device, and
the optical receiver further includes
circuitry configured to detect the identifying signal to respectively match the plurality of optical transmission lines of the transmission device to a plurality of optical transmission lines of the optical receiver, and
a switch configured to switch respective connection states between the plurality of optical transmission lines of the transmission device and the plurality of optical transmission lines of the optical receiver based on the matching result.

19. An optical cable comprising:
an optical transmission line configured to transmit a first or second optical signal;
a connector that is attached to an end of the optical transmission line, and is configured to connect to an optical connector port of a device in a first orientation or a second orientation; and
a reflecting surface that is formed at the connector, configured to reflect the first optical signal transmitted by a first light emitter into the optical transmission line or toward a first light receiver when the connector is connected to the device in the first orientation and configured to reflect a second optical signal transmitted by a second light emitter into the optical transmission line or toward a second light receiver when the connector is connected to the transmission device in the second orientation.

20. A light transmission method comprising:
connecting an optical connector port of a transmission device including first and second light emitters to a first connector of an optical cable connected in a first orientation in which first optical signals are received from the first light emitters or a second orientation in which second optical signals are received from the second light emitters and which is different from the first orientation via a plurality of first optical transmission lines;

connecting an optical connector port of a reception device including first and second light receivers to a second connector of the optical cable connected in a first orientation in which the first optical signals are received by the first light receiver or a second orientation in which the second optical signals are received by the second light receiver and which is different from the first orientation via a plurality of second optical transmission lines;

causing the reception device to receive identifying information for identifying the plurality of first optical transmission lines of the transmission device;

causing the reception device to respectively match the plurality of first optical transmission lines of the transmission device to the plurality of optical transmission lines of the reception device based on the identifying information; and causing the reception device to switch respective connection states between the plurality of first optical transmission lines of the transmission device and the plurality of second optical transmission lines of the reception device based on the matching result.

\* \* \* \* \*